US011434819B2

(12) United States Patent
Murugappan et al.

(10) Patent No.: US 11,434,819 B2
(45) Date of Patent: Sep. 6, 2022

(54) ACOUSTIC LINERS WITH ENHANCED ACOUSTIC ABSORPTION AND REDUCED DRAG CHARACTERISTICS

(71) Applicants:General Electric Company, Schenectady, NY (US); MRA Systems, LLC, Baltimore, MD (US)

(72) Inventors: Shanmugam Murugappan, Mason, OH (US); Michael Moses Martinez, Cincinnati, OH (US); Egbert Geertsema, Cincinnati, OH (US); Rudramuni Kariveerappa Majjigi, Cincinnati, OH (US); Richard David Cedar, Cincinnati, OH (US); Wendy Wenling Lin, Montgomery, OH (US); Robert William Davidoff, Pittsburgh, PA (US); David Patrick Calder, Baltimore, MD (US); Graham Frank Howarth, Middletown, DE (US)

(73) Assignees: GENERAL ELECTRIC COMPANY, Schenectady, NY (US); MRA SYSTEMS, LLC, Baltimore, MD (US)

( * ) Notice: Subject to any disclaimer, the term of this patent is extended or adjusted under 35 U.S.C. 154(b) by 610 days.

(21) Appl. No.: 16/370,124

(22) Filed: Mar. 29, 2019

(65) Prior Publication Data
US 2020/0309028 A1 Oct. 1, 2020

(51) Int. Cl.
*F02C 7/045* (2006.01)
*F04D 29/66* (2006.01)
*F02K 1/82* (2006.01)

(52) U.S. Cl.
CPC .............. *F02C 7/045* (2013.01); *F02K 1/827* (2013.01); *F04D 29/664* (2013.01)

(58) Field of Classification Search
CPC ......... F04D 29/664; F02K 1/827; F02C 7/045
(Continued)

(56) References Cited

U.S. PATENT DOCUMENTS 3,035,657 A    5/1962   Lemon
3,070,198 A   12/1962   Haskell
(Continued)

FOREIGN PATENT DOCUMENTS

EP           0405581 B1    10/1993
EP           0839101 B1     1/2002
(Continued)

OTHER PUBLICATIONS

Martinson, Mechanical Design for 3D Printing, Nov. 2012, 15 pages. http://eikimartinson.com/engineering/3dparts/#dovetail.
(Continued)

*Primary Examiner* — Forrest M Phillips
(74) *Attorney, Agent, or Firm* — Dority & Manning, P.A.

(57) ABSTRACT

An acoustic liner may include an acoustic core having an array of resonant cells, and an acoustic screen disposed across the array of resonant cells. The resonant cells include a plurality of cell walls and a resonant space defined by the plurality of cell walls. The acoustic core may include a folded acoustic core. Additionally, or in the alternative, at least some of the resonant cells may include an oblique polyhedral cellular structure and/or a multitude of sound-attenuating protuberances. The acoustic screen may include a reticulate membrane and a support lattice.

20 Claims, 24 Drawing Sheets

(58) Field of Classification Search
USPC .................................................. 181/292
See application file for complete search history.

(56) References Cited

U.S. PATENT DOCUMENTS

| | | | |
|---|---|---|---|
| 3,232,371 A | 2/1966 | Reichert et al. | |
| 3,734,234 A | 5/1973 | Wirt | |
| 3,803,754 A | 4/1974 | Fischer | |
| 3,819,009 A | 6/1974 | Motsinger | |
| 3,831,710 A | 8/1974 | Wirt | |
| 3,850,261 A | 11/1974 | Hehmann et al. | |
| 3,905,443 A | 9/1975 | Sieuzac | |
| 3,913,702 A | 10/1975 | Wirt et al. | |
| 4,001,473 A | 1/1977 | Cook | |
| 4,035,535 A | 7/1977 | Taylor | |
| 4,074,496 A | 2/1978 | Fischer | |
| 4,141,433 A | 2/1979 | Warnaka | |
| 4,243,117 A | 1/1981 | Warnaka | |
| 4,265,955 A | 5/1981 | Harp et al. | |
| 4,291,080 A | 9/1981 | Ely et al. | |
| 4,298,090 A | 11/1981 | Chapman | |
| 4,339,018 A | 7/1982 | Warnaka | |
| 4,551,110 A | 11/1985 | Selvage et al. | |
| 4,676,762 A | 6/1987 | Ballard | |
| 5,353,502 A | 10/1994 | Hattori et al. | |
| 5,445,861 A | 8/1995 | Newton et al. | |
| 5,480,729 A | 1/1996 | Hattori et al. | |
| 5,690,035 A | 11/1997 | Hatayama et al. | |
| 5,959,264 A | 9/1999 | Brück et al. | |
| 6,182,787 B1 | 2/2001 | Kraft et al. | |
| 6,200,664 B1 | 3/2001 | Figge et al. | |
| 6,203,656 B1 | 3/2001 | Syed | |
| 6,206,136 B1 | 3/2001 | Swindlehurst et al. | |
| 6,209,679 B1 | 4/2001 | Hogeboom et al. | |
| 6,256,959 B1 | 7/2001 | Palmersten | |
| 6,630,093 B1 | 10/2003 | Jones | |
| 6,772,857 B2 | 8/2004 | Porte et al. | |
| 6,840,349 B2 | 1/2005 | Andre et al. | |
| 6,871,725 B2 | 3/2005 | Johnson | |
| 6,884,486 B2 | 4/2005 | Estrin et al. | |
| 6,913,570 B2 | 7/2005 | Kehrle | |
| 7,410,455 B2* | 8/2008 | Akishev | E04C 2/328 |
| | | | 493/408 |
| 7,484,592 B2* | 2/2009 | Porte | G10K 11/168 |
| | | | 181/290 |
| 7,510,052 B2 | 3/2009 | Ayle | |
| 7,866,377 B2 | 1/2011 | Slaughter | |
| 7,906,205 B2 | 3/2011 | Meres | |
| 7,921,966 B2 | 4/2011 | Chiou et al. | |
| 7,935,205 B2 | 5/2011 | Bogue et al. | |
| 7,954,224 B2 | 6/2011 | Douglas | |
| 7,963,362 B2 | 6/2011 | Lidoine | |
| 7,967,108 B2 | 6/2011 | Harper | |
| 7,971,684 B2 | 7/2011 | Gantie et al. | |
| 8,016,230 B2 | 9/2011 | Fogarty et al. | |
| 8,047,326 B2 | 11/2011 | Valleroy et al. | |
| 8,464,831 B2 | 6/2013 | Olander Burak et al. | |
| 8,579,076 B2 | 11/2013 | Ayle et al. | |
| 8,689,936 B2 | 4/2014 | Richter | |
| 8,784,592 B2 | 7/2014 | Kolax et al. | |
| 8,789,652 B2 | 7/2014 | Swallowe et al. | |
| 8,905,189 B2 | 12/2014 | Ayle et al. | |
| 8,985,513 B2 | 3/2015 | Dean et al. | |
| 8,997,923 B2 | 4/2015 | Ichihashi | |
| 9,175,474 B2 | 11/2015 | May et al. | |
| 9,222,229 B1 | 12/2015 | Chang et al. | |
| 9,284,726 B2* | 3/2016 | Tien | B32B 3/26 |
| 9,290,274 B2 | 3/2016 | Roach et al. | |
| 9,296,044 B2 | 3/2016 | Douglas | |
| 9,302,869 B2 | 4/2016 | Kendrick et al. | |
| 9,365,022 B2 | 6/2016 | Kendrick et al. | |
| 9,378,721 B2 | 6/2016 | Zalewski et al. | |
| 9,514,734 B1 | 12/2016 | Jones et al. | |
| 9,546,602 B2 | 1/2017 | Julliard et al. | |
| 9,604,438 B2* | 3/2017 | Lumbab | G10K 11/161 |
| 9,607,600 B2 | 3/2017 | Swallowe et al. | |
| 9,643,392 B2* | 5/2017 | Butler | B32B 37/146 |
| 9,693,166 B2 | 6/2017 | Herrera et al. | |
| 9,759,447 B1 | 9/2017 | Mathur | |
| 9,909,471 B2 | 3/2018 | Mattia | |
| 9,978,354 B2 | 5/2018 | Nampy | |
| 10,032,445 B1 | 7/2018 | Linch et al. | |
| 10,107,139 B1 | 10/2018 | Jones et al. | |
| 10,174,675 B2 | 1/2019 | Martinez et al. | |
| 11,059,559 B2* | 7/2021 | Cedar | E04B 1/86 |
| 2001/0048027 A1 | 12/2001 | Walsh | |
| 2004/0048027 A1 | 3/2004 | Hayes et al. | |
| 2010/0307867 A1 | 12/2010 | Ogawa et al. | |
| 2011/0100749 A1 | 5/2011 | Nonogi et al. | |
| 2011/0244213 A1 | 10/2011 | Jones | |
| 2013/0306402 A1 | 11/2013 | Todorovic | |
| 2014/0133964 A1 | 5/2014 | Ayle | |
| 2014/0251481 A1 | 9/2014 | Kroll et al. | |
| 2014/0305529 A1 | 10/2014 | Kroll et al. | |
| 2014/0341744 A1 | 11/2014 | Cazuc et al. | |
| 2015/0027629 A1 | 1/2015 | Butler et al. | |
| 2015/0044413 A1 | 2/2015 | Vauchel et al. | |
| 2015/0064015 A1 | 3/2015 | Perez | |
| 2015/0110603 A1 | 4/2015 | Biset et al. | |
| 2015/0292413 A1 | 10/2015 | Soria et al. | |
| 2015/0373470 A1* | 12/2015 | Herrera | G10K 11/172 |
| | | | 156/196 |
| 2016/0010863 A1 | 1/2016 | Ott et al. | |
| 2016/0017775 A1 | 1/2016 | Mattia | |
| 2016/0017810 A1 | 1/2016 | Lord et al. | |
| 2016/0067938 A1 | 3/2016 | Goodrich | |
| 2016/0109130 A1 | 4/2016 | Stastny et al. | |
| 2016/0123160 A1 | 5/2016 | Strock et al. | |
| 2016/0319690 A1 | 11/2016 | Lin et al. | |
| 2017/0043550 A1 | 2/2017 | Coïc et al. | |
| 2017/0045059 A1 | 2/2017 | Care et al. | |
| 2017/0072638 A1 | 3/2017 | Hayes et al. | |
| 2017/0191414 A1 | 7/2017 | Martinez et al. | |
| 2018/0016987 A1 | 1/2018 | Howarth et al. | |
| 2018/0162542 A1 | 6/2018 | VanDeMark et al. | |
| 2018/0174568 A1* | 6/2018 | Porte | B32B 27/281 |
| 2018/0218723 A1 | 8/2018 | Lin et al. | |
| 2018/0245516 A1 | 8/2018 | Howarth et al. | |
| 2019/0080679 A1 | 3/2019 | Alstad | |
| 2019/0270504 A1 | 9/2019 | Cedar et al. | |

FOREIGN PATENT DOCUMENTS

| | | |
|---|---|---|
| EP | 2960023 A1 | 12/2015 |
| EP | 3232434 A1 | 10/2017 |
| JP | S58156052 U | 10/1983 |
| JP | H0333897 A | 2/1991 |
| WO | WO2016/0133501 A1 | 8/2016 |

OTHER PUBLICATIONS

Nark et al., Acoustic Liner Overview, Acoustics Technical Working Group Meeting, Nasa Langley Research Center, Cleveland, Oct. 22-23, 2019, pp. 1-25.

U.S. Appl. No. 16/150,448, filed Oct. 3, 2018.

U.S. Appl. No. 15/911,260, filed Mar. 5, 2018.

U.S. Appl. No. 16/058,171, filed Aug. 8, 2018.

Jones, et al., Evaluation of Parallel-Element, Variable-Impedance, Broadband Acoustic Liner Concepts, AIAA-2012-2194, Jun. 2012, 17 Pages.

Bertolucci, An Experimental Investigation of the Grazing Flow Impedance Duct at the University of Florida for Acoustic Liner Applications, University of Florida Dissertation, 2012, 217 Pages.

Bielak et al., Advanced Nacelle Acoustic Lining Concepts Development, NASA, CR-2002-211672, Aug. 2002, Total pp. 203.

Dai et al., Acoustic of a Perforated Liner with Grazing Flow: Floquet-Bloch Periodical Approach Versus Impedance Continuous Approach, Research Gate, The Journal of the Acoustical Society of America, Sep. 2016, 10 Pages. http://dx.doi.org/10.1121/1.4962490.

(56) References Cited

OTHER PUBLICATIONS

Dannemann et al., Experimental Study of Advanced Helmholtz Resonator Liners with Increased Acoustic Performance by Utilising Material Damping Effects, Applied Sciences, 2018, 18 Pages.

Kraft et al., Acoustic Treatment Design Scaling Methods, vol. 2: Advanced Treatment Impedance Models for High Frequency Ranges, NASA, CR-1999-209120, vol. 2, 1999, Total pp. 98.

Lawn, Acoustic Pressure Losses in Woven Screen Regenerators, ResearchGate, Applied Acoustics, vol. 77, Mar. 2014, pp. 42-48.

Malmary et al., Acoustic Impedance Measurement with Grazing Flow, AIAA-2001-2193, $7^{th}$ AIAA/CEAS Aeroacoustics Conference, May 2001, Netherlands, 9 Pages.

Motsinger et al., Design and Performance of Duct Acoustic Treatment, NASA, N92-14783, 1991, pp. 165-206. https://ntrs.nasa.gov/archive/nasa/casi.ntrs.nasa.gov/19920005565.pdf.

Primus et al., ONERA-NASA Cooperative Effort on Liner Impedance Education, AIAA 2013-2273, Research Gate, $19^{th}$ AIAA/CEAS Aeroacoustics Conference, May 2013, Germany, 16 Pages.

Schiller et al., Experimental Evaluation of Acoustic Engine Liner Models Developed with COMSOL Multiphysics, $23^{rd}$ American Institute of Aeronautics and Astronautics, DEAS Aeroacoustics Conference, NASA, 2017, 25 Pages. https://ntrs.nasa.gov/archive/nasa/casi.ntrs.nasa.gov/20170005768.pdf.

Sellen et al., Noise Reduction In a Flow Duct: Implementation of a Hybrid Passive/Active Solution, Science Direct, Journal of Sound and Vibration, vol. 297, 2006, pp. 492-511.

Soderman et al., Design and Development of a Deep Acoustic Lining for the 40-by 80 Foot Wind Tunnel Test Station, NASA TP-2002-211850, Nov. 2002, 61 Pages.

Syed et al., Paper No. 07ATC-43 Development of the Acousti-Cap TM Technology Double-Layer Acoustic Liners in Aircraft Engine Nacelles, Research Gate, 2007 SAE International, 23 Pages.

Tam et al., Experimental Validation of Numerical Simulations for An Acoustic Liner in Grazing Flow, 30 Pages. https://ntrs.nasa.gov/archive/nasa/casi.ntrs.nasa.gov/20130014086.pdf.

Tam et al., Numerical Simulation of a Slit Resonator in a Grazing Flow, AIAA 2006-799, $44^{th}$ AIAA Aerospace Meeting and Exhibit, Nevada, 2006, 20 Pages.

Zhang, Numerical Simulation of Two-Dimensional Acoustic Liners with High Speed Grazing Flow, MS Thesis, Urbana, Illinois, 2010, 90 Pages.

Zhou, Acoustic Characterization of Orifices and Perforated Liners with Flow and High-Level Acoustic Excitation, DiVA Digitala Vetenskapliga Arkivet, KTH Royal Institute of Technology School of Engineering Sciences (SCI), Aeronautical and Vehicle Engineering, MWL Flow Acoustics, Doctoral Thesis, Stockholm, p. vi, 2015, 70 Pages. http://www.diva-portal.org/smash/record.jsf?pid=diva2:813073.

\* cited by examiner

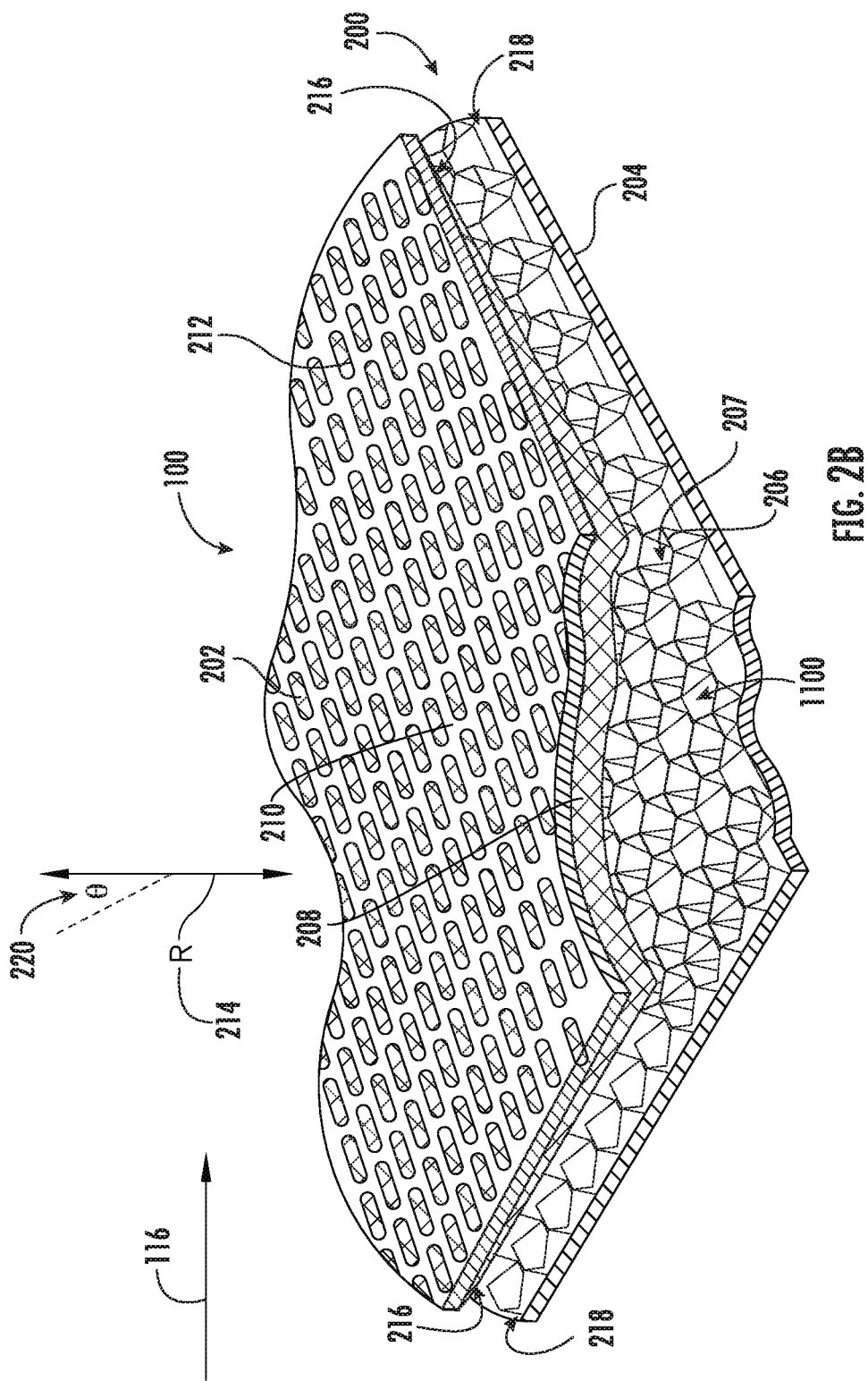

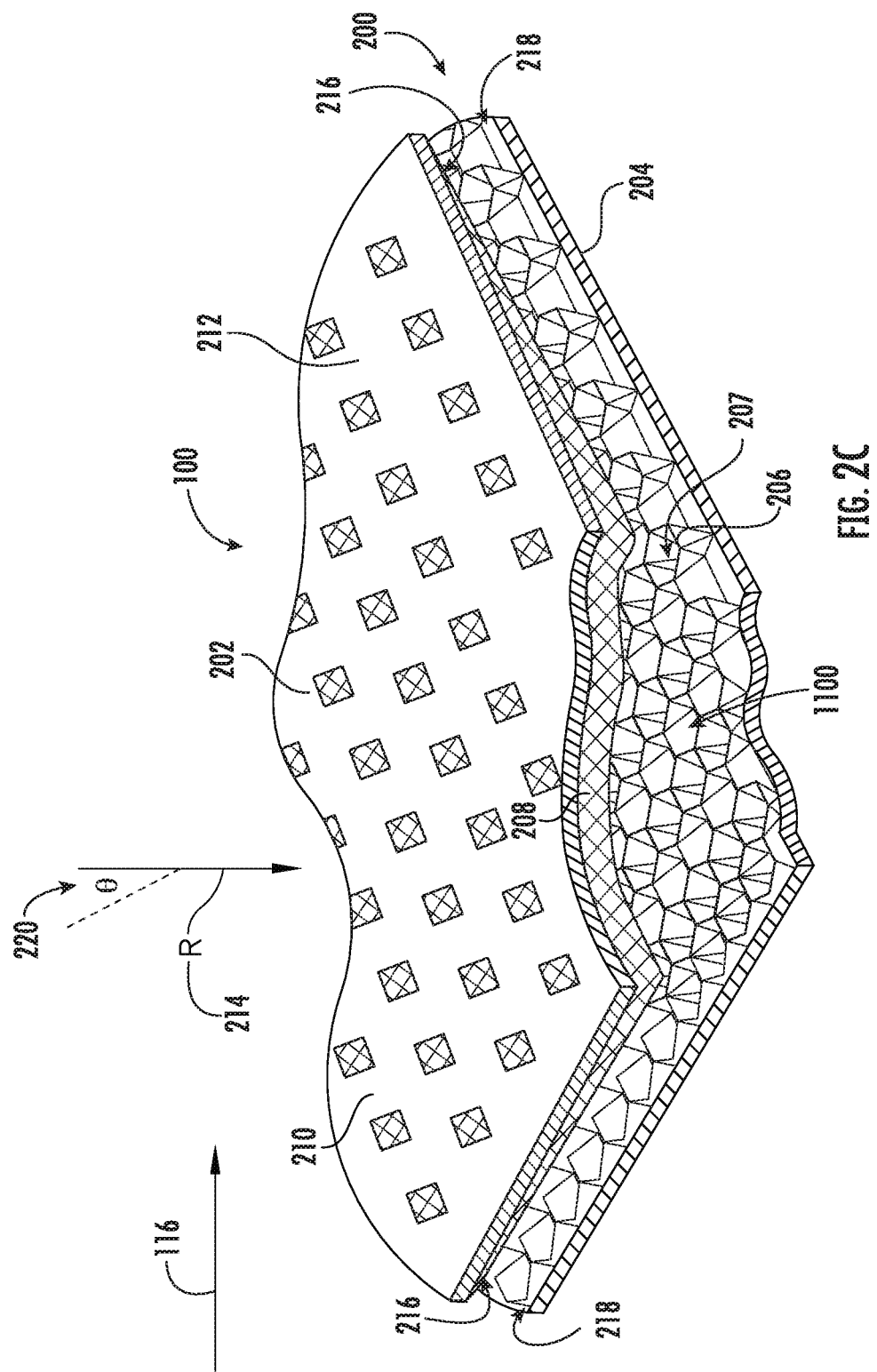

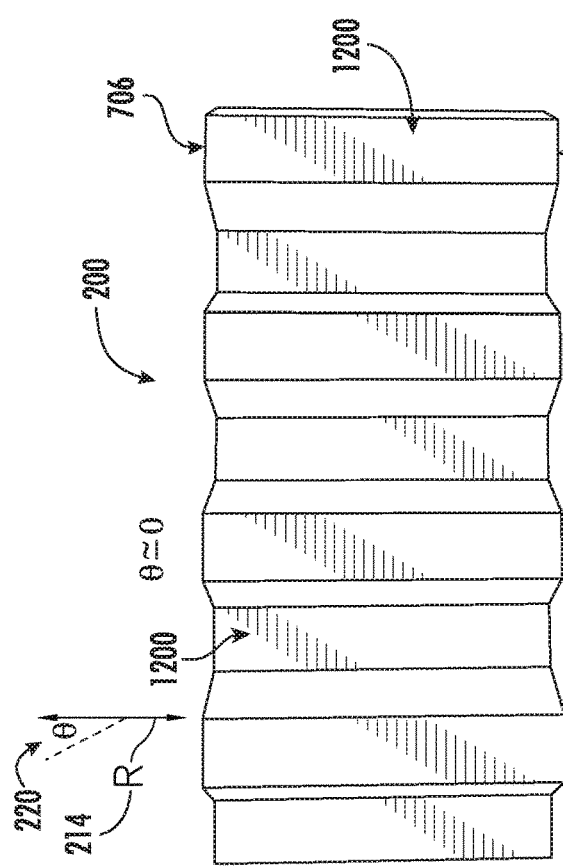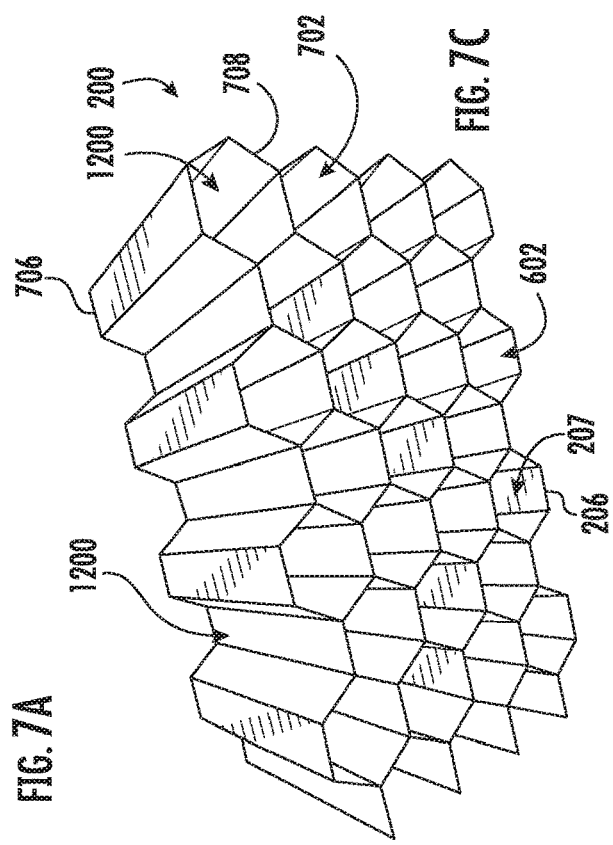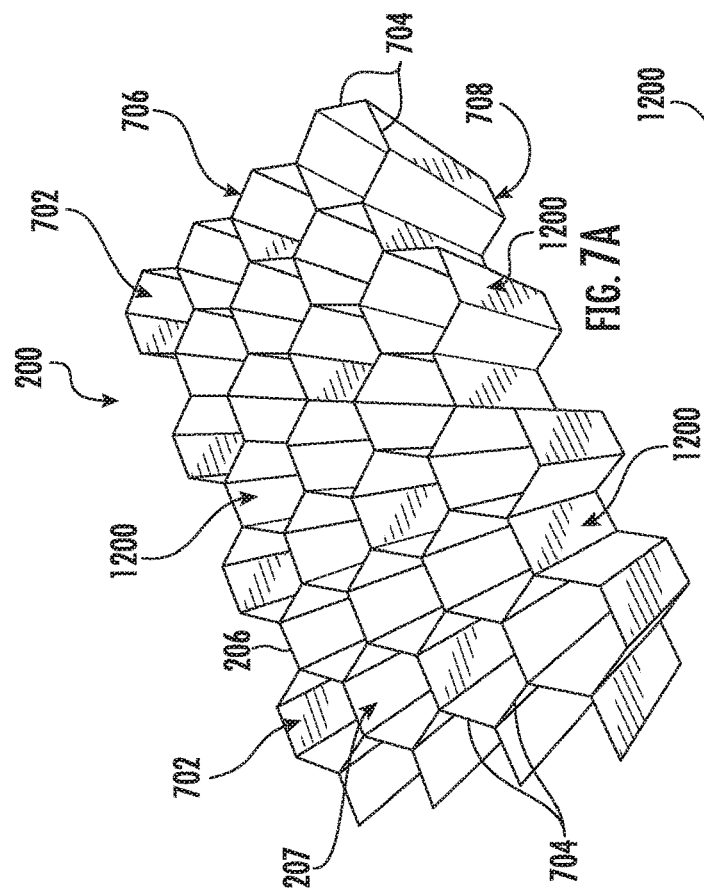
FIG. 7A
FIG. 7B
FIG. 7C

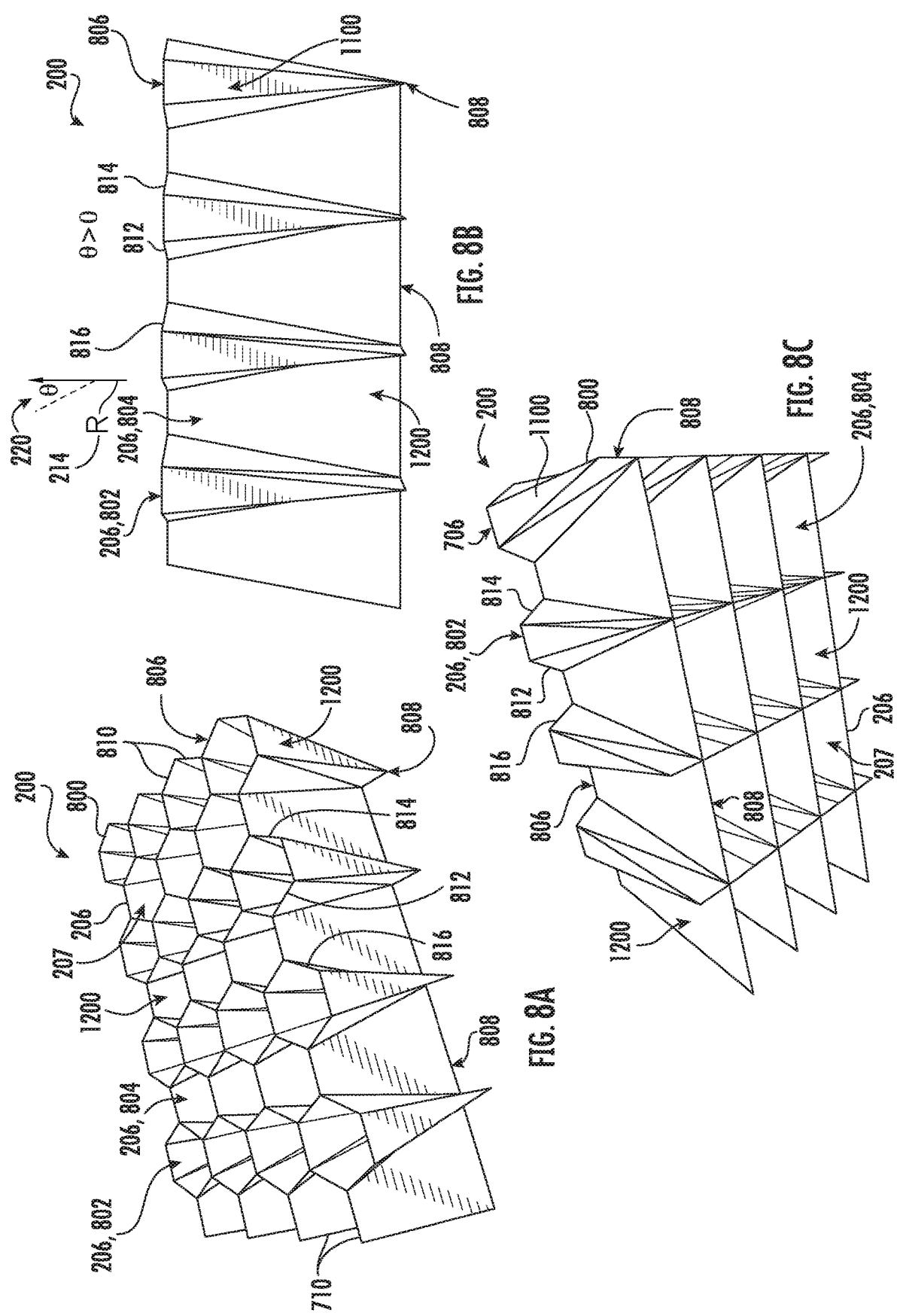

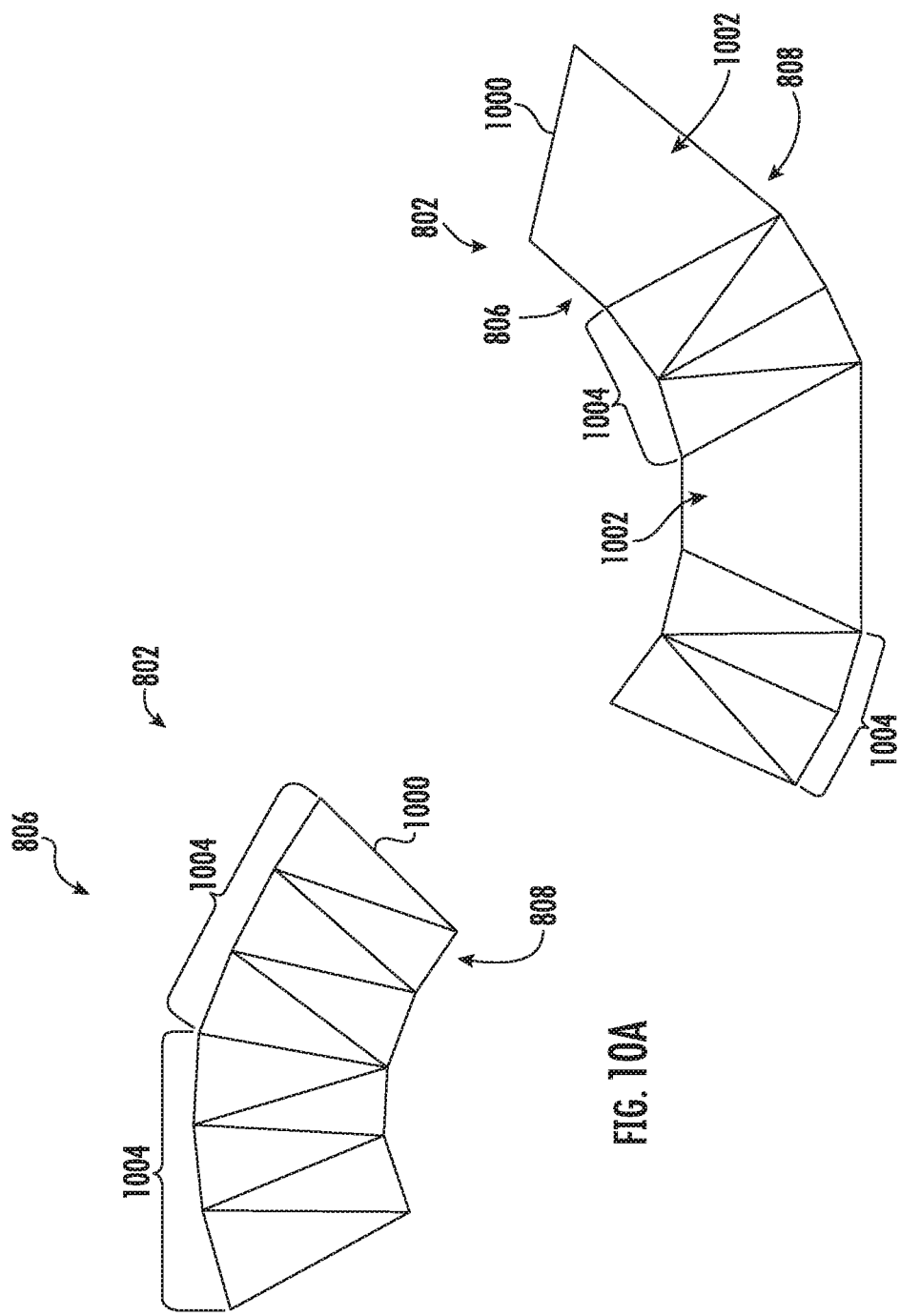

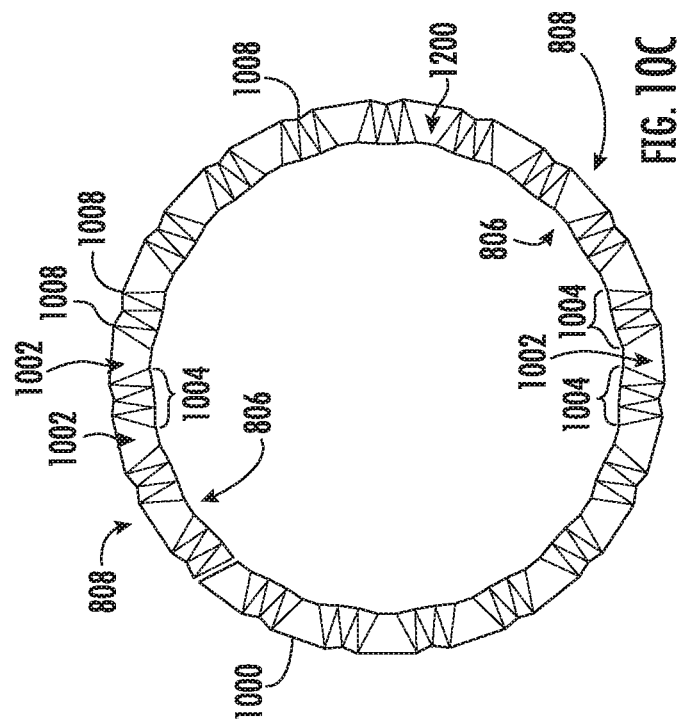
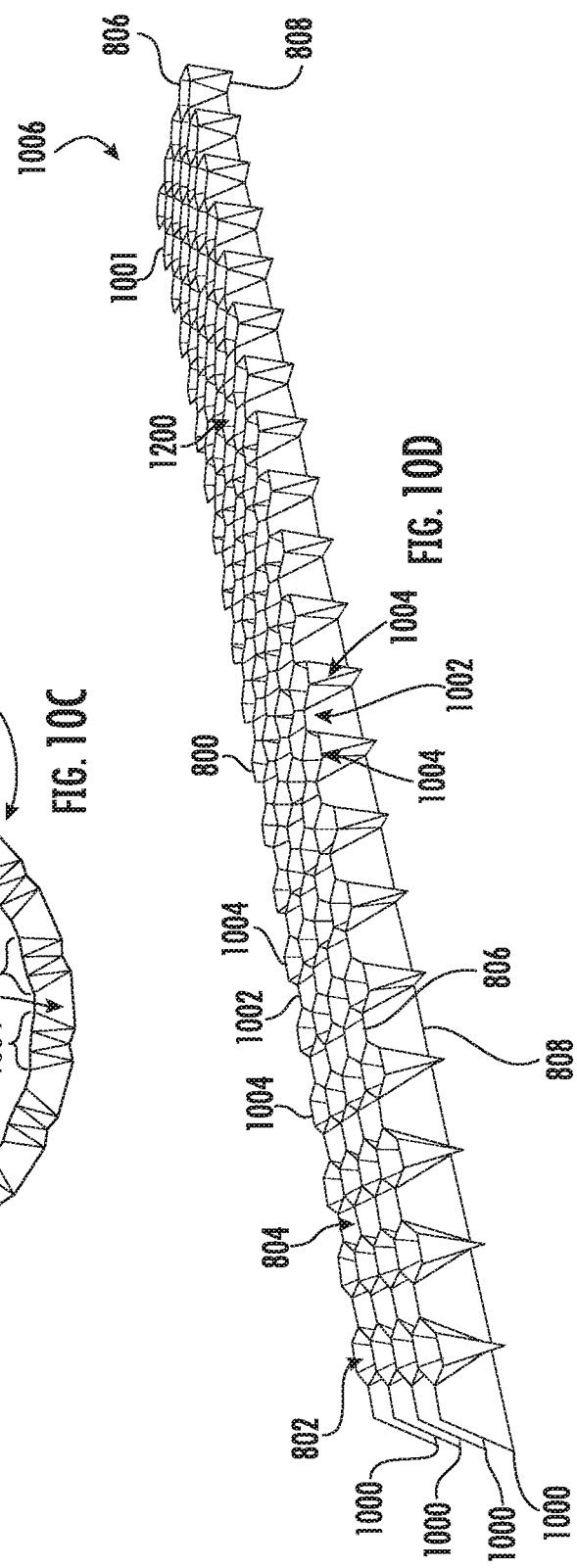

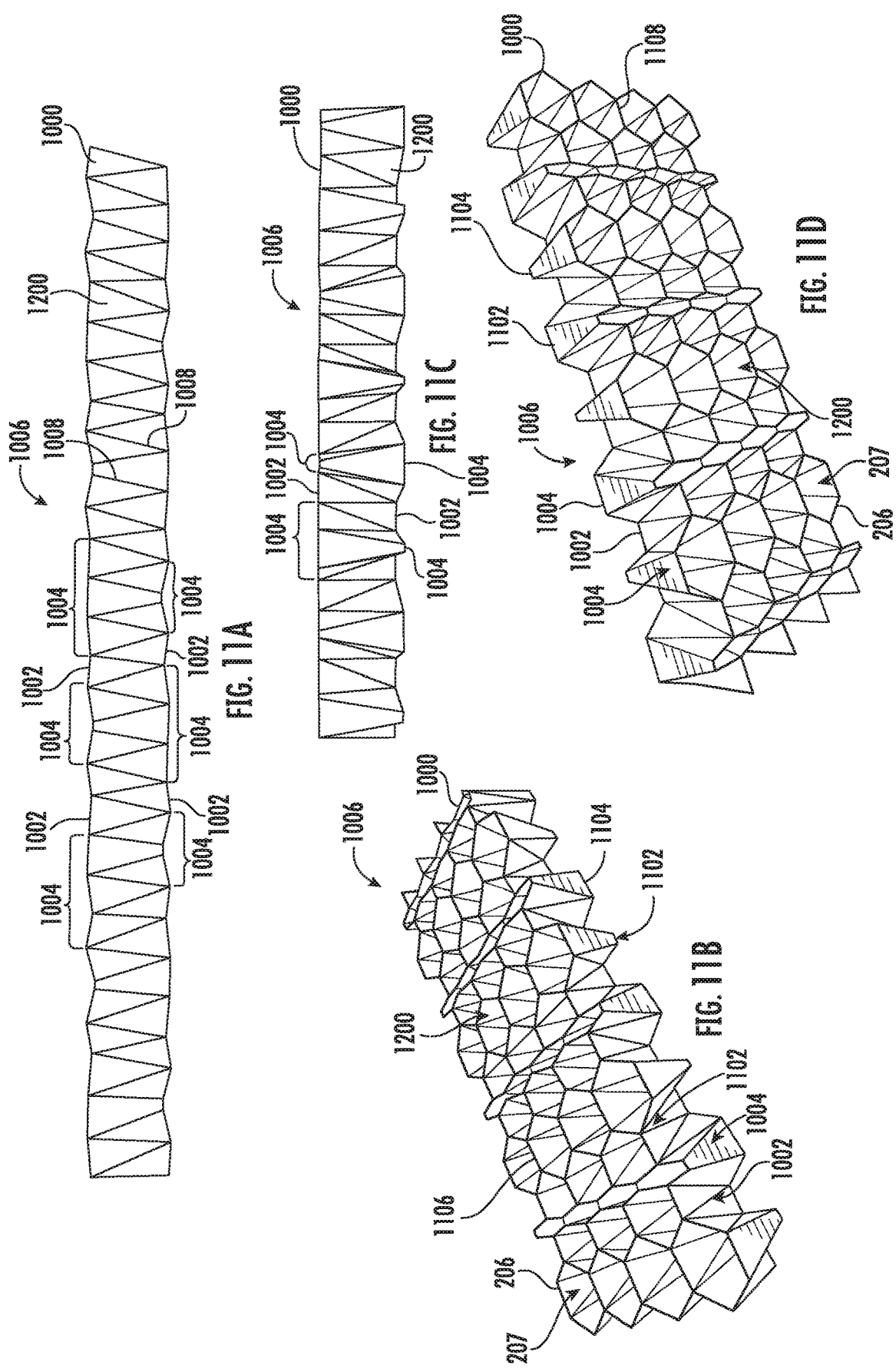

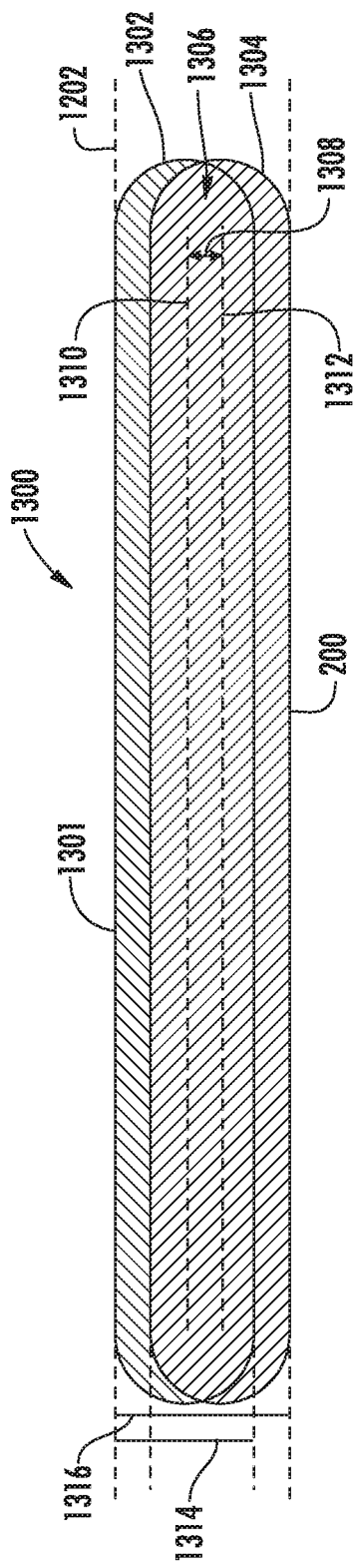
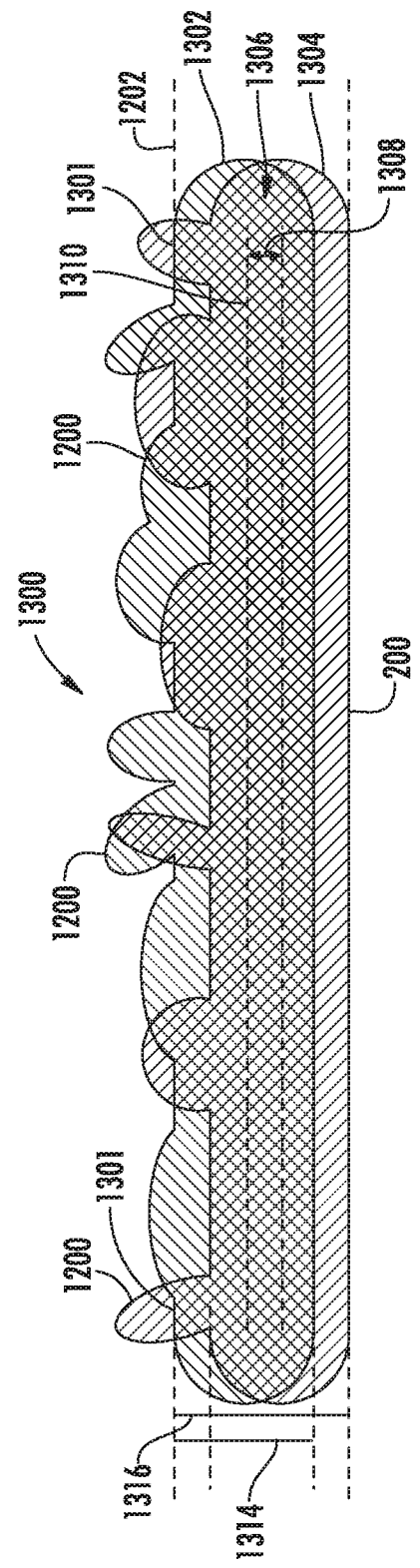

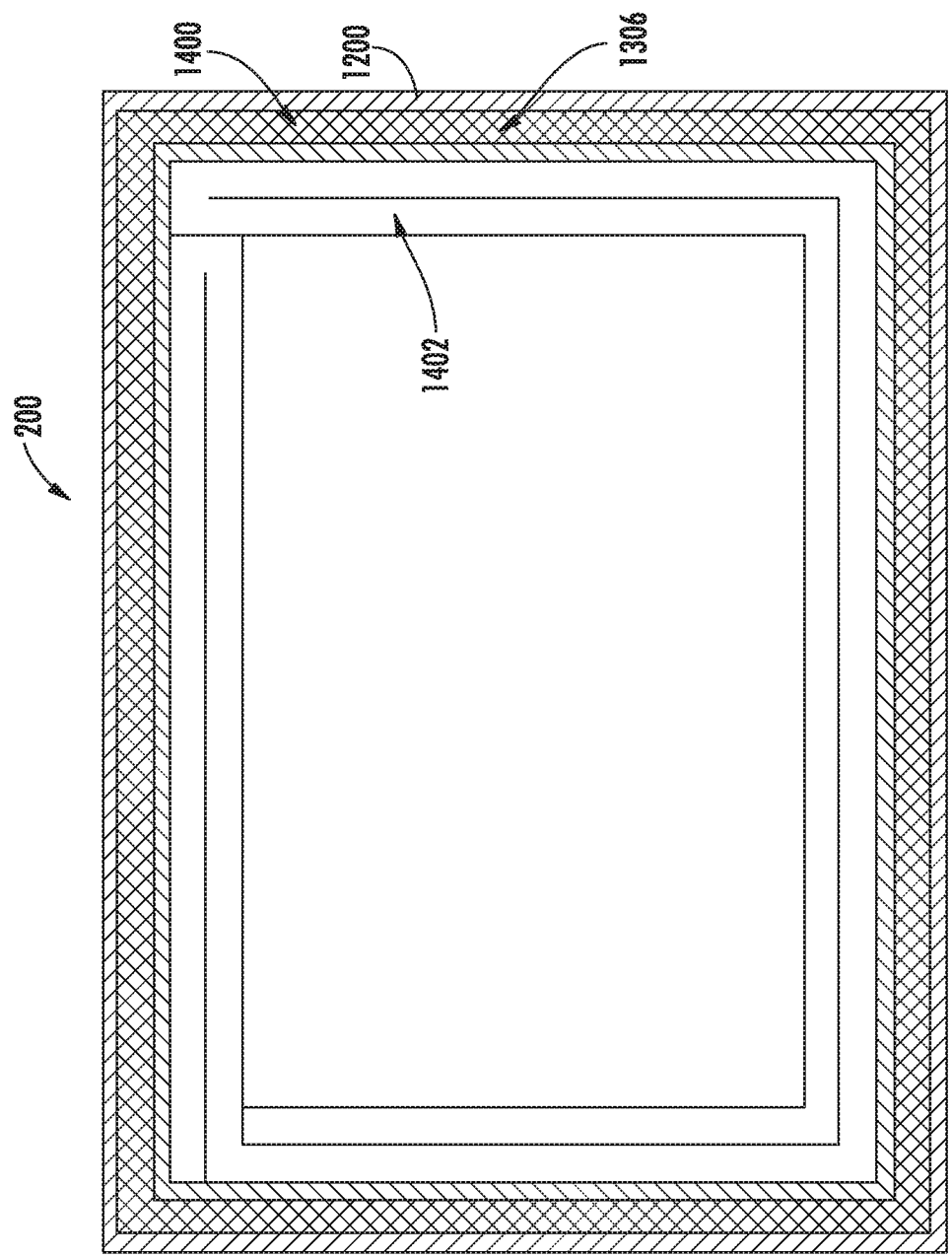

ACOUSTIC LINERS WITH ENHANCED ACOUSTIC ABSORPTION AND REDUCED DRAG CHARACTERISTICS

FIELD

The present disclosure pertains to acoustic cores that have enhanced acoustic absorption and reduced drag characteristics, as well as methods of making such acoustic cores and liners.

BACKGROUND

Acoustic liners may be used to dampen or attenuate sound waves. For example, acoustic liners are commonly used to dampen or attenuate noise from turbomachines such as turbofan engines. Typical acoustic liners include an acoustic core positioned between a perforated acoustic screen and a substantially imperforate back sheet. The perforated acoustic screen allows sound waves to enter the acoustic core. The acoustic core includes a plurality of resonant cells intended to dampen or attenuate sound waves. However, existing perforated acoustic screens may affect acoustic absorption to varying degrees, which may differ across a spectrum of frequencies. In fact, some acoustic cores may have perforated acoustic screens that exhibit unsatisfactory acoustic absorption properties generally, or with respect to at least certain absorption frequencies. Additionally, existing perforated acoustic screens may cause undesirable drag to varying degrees. Further, the extent and nature in which existing perforated acoustic screens affect acoustic absorption and drag also may vary depending on the speed of grazing flow across the surface of the perforated acoustic screen, as well as depending on the configuration of the acoustic core, such that some existing perforated acoustic screens may be less suitable at certain speeds and/or for certain acoustic core configurations.

Accordingly, there exists a need for improved acoustic liners, including improved acoustic screens for acoustic liners that exhibit enhance acoustic absorption and/or reduce drag. Additionally, there exists a need for improved methods of forming acoustic liners that have such improved acoustic absorption and/or reduced drag characteristics.

BRIEF DESCRIPTION

Aspects and advantages will be set forth in part in the following description, or may be obvious from the description, or may be learned through practicing the presently disclosed subject matter.

In one aspect, the present disclosure embraces acoustic liners. An exemplary acoustic liner may include an acoustic core having an array of resonant cells, and an acoustic screen disposed across the array of resonant cells. The resonant cells include a plurality of cell walls and a resonant space defined by the plurality of cell walls. The acoustic core may include a folded acoustic core. Additionally, or in the alternative, at least some of the resonant cells may include an oblique polyhedral cellular structure and/or a multitude of sound-attenuating protuberances. The acoustic screen may include a reticulate membrane and a support lattice. The support lattice may include a plurality of apertures extending therethrough.

The reticulate membrane may include a multitude of reticulations passing through a membrane matrix. The reticulate membrane may have a thickness of from 0.1 millimeters to 2.0 millimeters. The multitude of reticulations may have a cross-sectional width of from 1.0 micron to 2.0 millimeters. The reticulate membrane may be rigid or flexible. The resonant cells include a resonant space, and the apertures of the support lattice may provide an open area of from 20% to 100% of the surface area of the resonant space.

In some embodiments, the support lattice and/or the reticulate membrane may include a curved surface, and the curved surface may include an aerodynamic profile and/or a Coanda surface. In other embodiments, the reticulate membrane may additionally or alternatively include intra-membrane resonant cells and/or intra-membrane curved surfaces.

At least a portion of the acoustic core and/or at least a portion of the acoustic screen may be integrally formed using an additive manufacturing technology. By way of example, the reticulate membrane and/or the support lattice may be formed of a polymeric material, a metal alloy, and/or a composite materials. The reticulate membrane comprises a first reticulate membrane-material and a second reticulate membrane-material, the first reticulate membrane-material differing from the second reticulate membrane-material.

In another aspect, the present disclosure embraces turbomachines that include an acoustic liner. An exemplary turbomachine may include a turbine, a fan rotor, a housing or nacelle defining a duct wall surrounding the turbine and/or the fan rotor, and one or more acoustic liners disposed annularly along the duct wall. At least one of the one or more acoustic liners may include an acoustic core having an array of resonant cells, and an acoustic screen disposed across the array of resonant cells. The resonant cells include a plurality of cell walls and a resonant space defined by the plurality of cell walls. The acoustic core may include a folded acoustic core. Additionally, or in the alternative, at least some of the resonant cells may include an oblique polyhedral cellular structure and/or a multitude of sound-attenuating protuberances. The acoustic screen may include a reticulate membrane and a support lattice. The support lattice may include a plurality of apertures extending therethrough.

In yet another aspect, the present disclosure embraces methods of forming an acoustic liner. An exemplary method may include attaching an acoustic screen to an acoustic core. The acoustic screen may include a reticulate membrane and a support lattice, and the acoustic core may include an array of resonant cells having a plurality of cell walls and a resonant space defined by the plurality of cell walls. The acoustic core may include a folded acoustic core. Additionally, or in the alternative, at least some of the resonant cells may include an oblique polyhedral cellular structure and/or a multitude of sound-attenuating protuberances.

In some embodiments, an exemplary method may include forming the reticulate membrane and/or the support lattice at least in part using an additive manufacturing technology. Additionally, or in the alternative, an exemplary method may include forming the acoustic core at least in part using an additive manufacturing technology. Further, exemplary methods may additionally or alternatively include forming sound-attenuating protuberances on at least a portion of the acoustic screen and/or forming sound-attenuating protuberances on at least a portion of the resonant cells. In still further embodiments, exemplary methods may additionally or alternatively include forming the acoustic core at least in part using a folded core technology.

These and other features, aspects and advantages will become better understood with reference to the following description and appended claims. The accompanying drawings, which are incorporated in and constitute a part of this specification, illustrate exemplary embodiments and, together with the description, serve to explain certain principles of the presently disclosed subject matter.

BRIEF DESCRIPTION OF THE DRAWINGS

A full and enabling disclosure, including the best mode thereof, directed to one of ordinary skill in the art, is set forth in the specification, which makes reference to the appended Figures, in which:

FIG. 2A-2D schematically depict isometric partial cutaway views of a portion of an exemplary acoustic liner;

FIGS. 7A-7C respectively depict a top perspective view, a side view, and a bottom perspective view of an acoustic core that has a parallel polyhedral cellular structure;

FIGS. 8A-8C respectively depict a top perspective view, a side view, and a bottom perspective view of an acoustic core that has an oblique polyhedral cellular structure;

FIGS. 10A and 10B respectively depict a converging polyhedral cell and a diverging polyhedral cell from the exemplary acoustic core depicted in FIGS. 8A-8C, projected onto a two-dimensional space;

FIG. 10C schematically depicts an exemplary core material strip, a plurality of which may be selectively adhered and folded or expanded to form an acoustic core;

FIG. 10D schematically depict a perspective view of an acoustic core formed using a folded core technology using core material strips configured as shown in FIG. 10C;

FIG. 11A schematically depicts another exemplary core material strip, a plurality of which may be selectively adhered and folded or expanded to form an acoustic core;

FIGS. 11B-11D respectively depict a top perspective view, a side view, and a bottom perspective view of an acoustic core formed using a folded core technology using core material strips configured as shown in FIG. 11A;

FIGS. 13A and 13B schematically depict exemplary toolpaths which may be used to additively manufacture an acoustic core with sound-attenuating protuberances;

FIG. 14 schematically depicts an exemplary external contour with overlapping toolpath passes intended to form sound-attenuating protuberances, and internal contours adjacent to the external contour;

Figure 1:
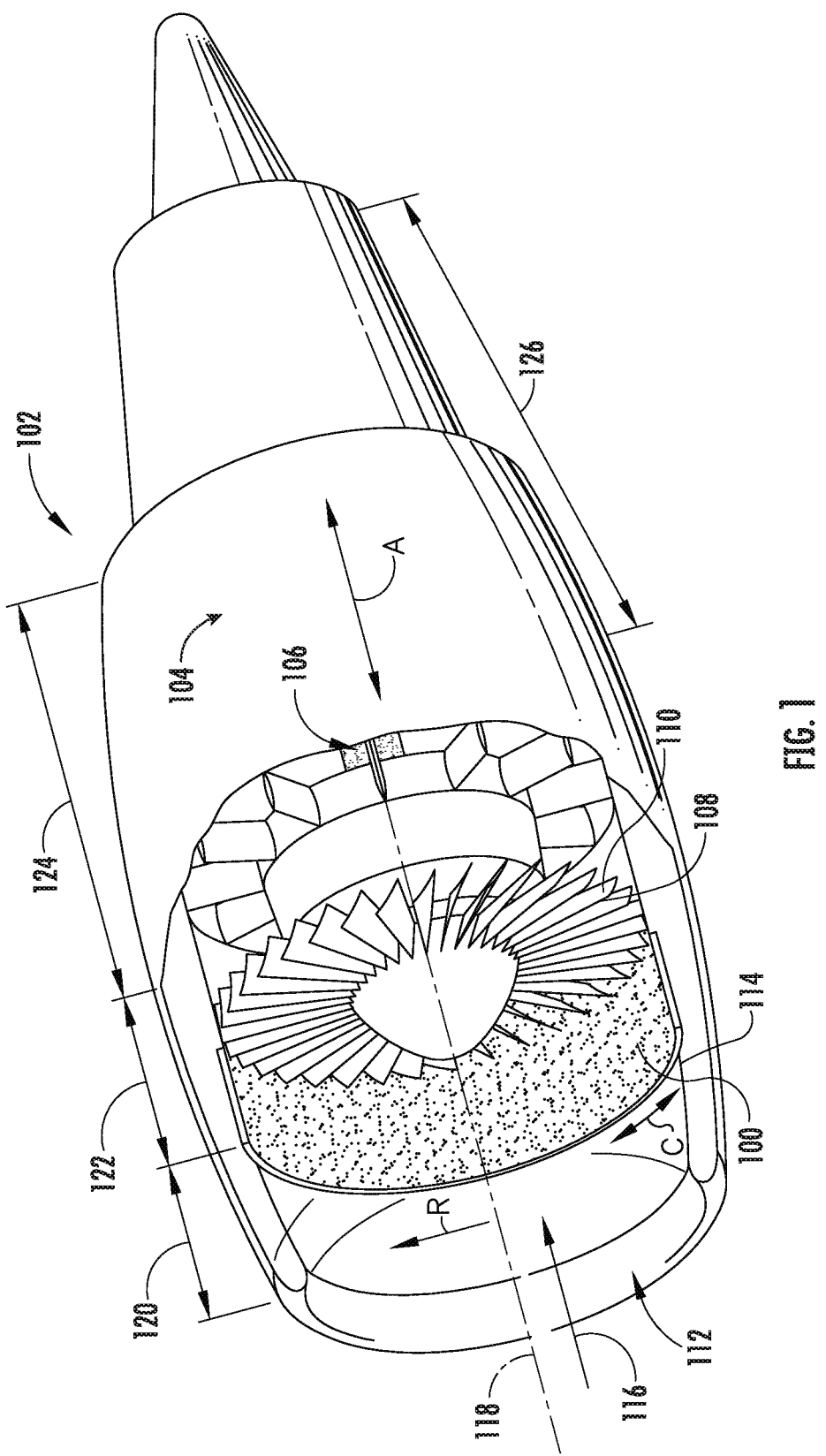
FIG. 1 schematically depict a perspective partial cutaway view of a turbomachine that has an acoustic liner.

Repeat use of reference characters in the present specification and drawings is intended to represent the same or analogous features or elements of the present disclosure.

DETAILED DESCRIPTION

Reference now will be made in detail to exemplary embodiments of the presently disclosed subject matter, one or more examples of which are illustrated in the drawings. Each example is provided by way of explanation and should not be interpreted as limiting the present disclosure. In fact, it will be apparent to those skilled in the art that various modifications and variations can be made in the present disclosure without departing from the scope or spirit of the present disclosure. For instance, features illustrated or described as part of one embodiment can be used with another embodiment to yield a still further embodiment. Thus, it is intended that the present disclosure covers such modifications and variations as come within the scope of the appended claims and their equivalents.

Acoustic liners for damping or attenuating sound waves are described herein. Acoustic liners may be used, for example, to dampen or attenuate noise generated by or emanating from various aspects or components of turbomachines, such as turbofan engines commonly used in aircraft, including commercial, military, and civilian aircraft. Acoustic liners may be used for damping and attenuating noise from a wide variety of turbomachines, including, turbojets, turbofans, turboprops, turboshafts, ramjets, rocket jets, pulse-jets, turbines, gas turbines, steam turbines, marine engines, and the like. More broadly, acoustic liners may be used to dampen or attenuate sound waves from any source that might be within the contemplation of those skilled in the art.

The presently disclosed acoustic liners include an array of resonant cells having a plurality of cell walls and a resonant space 207 defined by the plurality of cell walls, and an acoustic screen disposed across the array of resonant cells. The acoustic screen includes a reticulate membrane and a support lattice. The presently disclosed acoustic screens may be configured to provide a relatively constant acoustic impedance across a spectrum of frequencies, meaning that the acoustic impedance of the acoustic screen is generally unaffected by the amplitude of the sound pressure level and the gazing flow Mach number.

The presently disclosed acoustic liners are in contrast with conventional acoustic liners that have a perforated acoustic screen, such as those with numerous small perforations or holes, which are known to exhibit an acoustic impedance that can be greatly affected by both sound pressure level and the grazing-flow Mach number. The presently disclosed acoustic liners are also in contrast with conventional acoustic liners that have a wiremesh acoustic screens adhered to an array of resonant cells with no supporting perforated acoustic screen, which may provide a relatively linear acoustic impedance but generally require undesirably small resonant cells and the wiremesh may be prone to becoming damaged or dislodged by debris, and the adhesive used to adhere the wiremesh tends to become partially blocked by adhesive materials used for adhering the wiremesh to the resonant cells. A conventional perforated acoustic screen may be placed on top of a wiremesh to provide support; however, such a conventional perforate acoustic screen may undesirably introduce variable acoustic impedance properties that depend on sound pressure level and grazing-flow Mach number.

Exemplary embodiments of the presently disclosed acoustic liners may be produced at least in part using an additive manufacturing technology. The use of an additive manufacturing technology allows for novel resonant cell configuration, geometries, and/or features, as well as novel acoustic screens that avoid the aforementioned shortcomings with conventional acoustic liners. In exemplary embodiments, an acoustic screen may be integrally formed with an array of resonant cells using an additive manufacturing technology, thereby eliminating the need for an adhesive while also permanently securing the acoustic screen to the array of resonant cells. For example, an additive manufacturing technology may be used to provide an additively-manufactured acoustic core or an additively-manufactured acoustic core segment that includes an additively-manufactured array of resonant cells and/or an additively-manufactured acoustic screen. The additively-manufactured acoustic screen may include an additively-manufactured reticulate membrane and/or an additively-manufactured support lattice. In some embodiments, the additively-manufactured array of resonant cells and the additively-manufactured acoustic screen may be formed using the same additive manufacturing technology and/or as part of the same additive build process.

It is understood that terms "upstream" and "downstream" refer to the relative direction with respect to fluid flow in a fluid pathway. For example, "upstream" refers to the direction from which the fluid flows, and "downstream" refers to the direction to which the fluid flows. It is also understood that terms such as "top", "bottom", "outward", "inward", and the like are words of convenience and are not to be construed as limiting terms. As used herein, the terms "first", "second", and "third" may be used interchangeably to distinguish one component from another and are not intended to signify location or importance of the individual components. The terms "a" and "an" do not denote a limitation of quantity, but rather denote the presence of at least one of the referenced item.

Here and throughout the specification and claims, range limitations are combined and interchanged, and such ranges are identified and include all the sub-ranges contained therein unless context or language indicates otherwise. For example, all ranges disclosed herein are inclusive of the endpoints, and the endpoints are independently combinable with each other.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems.

Exemplary embodiments of the present disclosure will now be described in further detail. As shown in FIG. 1, one or more acoustic liners 100 may provide a system for damping or attenuating sound waves, such as sound waves associated with a turbofan engine 102. As shown, a turbofan engine 102 includes a housing or nacelle 104 surrounding a turbine 106 and/or a fan rotor 108, which includes a plurality of circumferentially spaced fan blades 110 powered by the turbine 106. An exemplary housing or nacelle 104 includes an inlet 112 and a duct having a duct wall 114 that directs airflow 116 downstream through a fan rotor 108, generally along a longitudinal axial centerline 118. In some embodiments, one or more acoustic liners provide a system for damping or attenuating sound waves. An exemplary system may include one or more acoustic liners 100 disposed annularly along the duct wall 114. The one or more acoustic liners 100 may have a position along the duct wall 114 located upstream from the fan blades 110. One or more acoustic liners may also be positioned downstream from the fan blades 110. For example, an acoustic liner may be positioned at or aft of an inner barrel 120 portion of the nacelle 104. Additionally, or alternatively, one or more acoustic liners 100 may be positioned at or aft of a fan casing portion 122 and/or a transcowl portion 124 of a nacelle 104. In some embodiments, a turbofan engine 102 may include a plurality of housings surrounding a turbine 106. In some embodiments, a plurality of housings may be configured and arranged annularly relative to one another. Each such housing may include an inner duct wall 114 and an outer duct wall 114. One or more acoustic liners 100 may be positioned about an inner duct wall 114 and/or an outer duct wall 114 of any one or more of a plurality of housings. Additionally, one or more acoustic liners 100 may be positioned in proximity to non-rotating portions of the fan casing portion 122 or other components of the turbofan engine 102. These positions include ducts or casings within the turbofan engine 102 where an acoustic liner may be effective for noise suppression (e.g., damping or attenuation) at various frequency ranges, including across a spectrum of frequency ranges. For example, one or more acoustic liners 100 may be positioned at a core cowl portion 126. Those skilled in the art will appreciate even further areas where acoustic liners 100 may be positioned to dampen or attenuate noise generated by or emanating from various aspects of a turbofan engine 102, all of which are within the scope of the present disclosure.

In operation, a turbofan engine 102 generates a tremendous amount of noise. To illustrate a typical source of turbofan engine 102 noise, it will be appreciated that the fan rotor 108 rotates within the fan casing portion 122, producing discrete tonal noise predominately at a blade passage frequency (BPF) and multiples thereof. During take-off of the aircraft, the fan blades 110 reach transonic and supersonic rotational velocities, generating noise that propagates out of the fan duct into the surrounding environment. In exemplary embodiments, one or more acoustic liners 100 are configured and arranged to suppress noise resonating at the BPF and harmonics of the BPF. The one or more acoustic liners 100 or various portions thereof may be configured to dampen or attenuate sound waves and thereby reduce the sound at specific frequencies or across a range of frequencies. Some aspects of an acoustic liner 100 may be configured to reflect incident sound waves multiple times before the sound waves escape the acoustic liner 100. These multiple reflections may reduce the amplitude of the sound waves. Additionally, some aspects of an acoustic liner 100 may be configured to cause sound waves to become out-of-phase. When sound waves become out-of-phase, various portions of the sound waves tend to cancel one another, thereby reducing at least some of the energy in the sound waves.

FIGS. 2A-2D show isometric partial cutaway views of a portion of an exemplary acoustic liner 100. The acoustic liners 100 shown in FIGS. 2A-2D may be configured for use with the turbofan engine 102 shown in FIG. 1 or for attenuating noise from any other source within the contemplation of those skilled in the art. In some embodiments, the acoustic liner 100 may be disposed proximate to airflow 116 (also shown in FIG. 1). The acoustic liner 100 may be secured within the turbofan engine 102 by a flange or other attachment with the duct wall 114 and/or the fan casing portion 122. The acoustic liner 100 includes an acoustic core 200 positioned between an acoustic screen 202 and a substantially imperforate back sheet 204. The acoustic screen 202 and back sheet 204 form planes having a generally parallel orientation relative to one another. The acoustic core 200 is made up of hollow cellular structures or resonant cells 206 disposed between the acoustic screen 202 and the back sheet 204. The resonant cells 206 include a plurality of cell walls that define a hollow resonant space 207 207. The acoustic screen 202 includes a reticulate membrane 208 and a support lattice 210. In exemplary embodiments, the reticulate membrane 208 may be disposed proximal to the acoustic core 200 and the support lattice 210 disposed distal to the acoustic core 200. However, in some embodiments at least a portion of the support lattice 210 may be disposed proximal to the acoustic core with at least a portion of the reticulate membrane 208 disposed distal to the acoustic core 200 relative to such at least a portion of the support lattice 210. Additionally, or in the alternative, at least a portion of the support lattice 210 may be disposed flush with at least a portion of the reticulate membrane 208. For example, a top surface of the support lattice 210 may be located in substantially even plane with a top surface of the reticulate membrane 210. Additionally, or in the alternative, at least a portion of the support lattice 210 may pass through or interrupt the reticulate membrane 208 relative to a normal line 214.

The reticulate membrane 208 may include a multitude of reticulations 400 passing through a membrane matrix 401 (FIGS. 4A-4F). An exemplary reticulate membrane 208 may include reticulations that have any desired shape, including elliptical and/or polyhedral shaped reticulations. The reticulations may pass directly through the reticulate membrane 208, and/or the reticulations may define a complex network of interconnected reticulations throughout the reticulate membrane 208. The reticulations may have a clearly defined shape and/or size, or a distribution of shapes and/or sizes, such as a random distribution. In some embodiments, the reticulate membrane 208 may be have a mesh or fibrous composition and may include sound-attenuating protuberances as described herein.

The reticulate membrane 208 may be rigid or flexible and may include one or more layers which may differ from one another. In some embodiments, the reticulate membrane 208 may include pre-loaded tension, such as by stretching the reticulate membrane 208 across the array of resonant cells 206 and/or by subjecting the reticulate membrane 208 to a thermal or chemical curing process that introduces such pre-loaded tension. Such pre-loaded tension may increase the acoustic absorption properties of an acoustic liner 100. For example, grazing flow (such as from air flow 116) and/or fluid within the resonant cells 206 may interact with the pre-loaded reticulate membrane 208, and the pre-loaded tension may allow the reticulate membrane 208 to absorb a greater amount of acoustic energy and thereby provide enhanced acoustic impedance. Additionally, or in the alternative, energy absorption may be enhanced by providing a degree of flexibility in the reticulate membrane 208 such that grazing flow (such as from air flow 116) and/or fluid within the resonant cells 206 activate the flexibility of the reticulate membrane 208 and thereby provide enhanced acoustic impedance. The reticulate membrane 208 may be formed of polymeric materials (e.g., a thermoplastic and/or elastomeric material), metal alloys, and/or composite materials, and may be in the form of a wire mesh, a web, or a woven or nonwoven fibrous material (e.g., synthetic fibers) that has reticulations applied thereto or that has reticulate characteristics as formed.

The reticulate membrane 208 may have a thickness of from about 0.1 millimeters (mm) to about 2.0 mm, such as from about 0.1 mm to about 1.0 mm, such as from about 0.1 mm to about 1.0 mm, such as from about 0.5 mm to about 1.5 mm, such as from about 1.0 mm to about 2.0 mm, or such as from about 1.5 mm to about 2.0 mm. The reticulate membrane 208 may have a thickness of at least about 0.1 mm, such as at least about 0.5 mm, such as at least about 1.0 mm, or such as at least about 1.5 mm. The reticulate membrane 208 may have a thickness of less than about 2.0 mm, such as less than about 1.5 mm, such as less than about 1.0 mm, or such as less than about 0.5 mm.

The reticulations in the reticulate membrane 208 may have a cross-sectional width of from about 1.0 micron ($\mu$m) to about 2.0 millimeters (mm), such as from about 1 $\mu$m to about 1,000 $\mu$m, such as from about 50 $\mu$m to about 1,000 $\mu$m, such as from about 100 $\mu$m to about 500 $\mu$m, such as from about 250 $\mu$m to about 750 $\mu$m, such as from about 750 $\mu$m to about 1.5 mm, such as from about 1.0 mm to about 2.0 mm, or such as from about 1.5 mm to about 2.0 mm. The reticulations in the reticulate membrane 208 may have a cross-sectional width of at least about 1.0 $\mu$m, such as at least about 50 $\mu$m, such as at least about 100 $\mu$m, such as at least about 250 $\mu$m, such as at least about 500 $\mu$m, such as at least about 750 $\mu$m, such as at least about 1.0 mm, or such as at least about 1.5 mm. T The reticulations in the reticulate membrane 208 may have a cross-sectional width of less than about 2.0 mm, such as less than about 1.5 mm, such as less than about 1.0 mm, such as less than about 0.5 mm, such as less than about 1.0 mm, such as less than about 750 $\mu$m, such as less than about 500 $\mu$m, such as less than about 250 $\mu$m, such as less than about 100 $\mu$m, such as less than about 50 $\mu$m.

The support lattice 210 provides support for the reticulate membrane 208 and may also be formed of polymeric materials (e.g., a thermoplastic material or elastomeric polymers), metal alloys, and/or composite materials. The support lattice 210 includes a plurality of apertures 212 extending therethrough so as to allow sound waves to interact with the reticulate membrane 208 and enter the resonant cells 206 of the acoustic core 200. The apertures 212 may be positioned and arranged in at least one of a repeating pattern and a random pattern. In an exemplary embodiments, the apertures 212 may be positioned and spaced in a manner that corresponds to the positioning and spacing of the array of resonant cells 206 that make up the acoustic core 200. The apertures 212 and resonant cells 206 may have a one-to-one or many-to-one relationship. For example, in some embodiments, an acoustic liner 100 may include one aperture 212 positioned adjacent to a respective resonant cell 206 so as to allow fluid to interact with the reticulate membrane 208 and enter such resonant cell 206. Other embodiments may include a plurality of apertures 212 positioned adjacent to a respective resonant cell 206.

The reticulate membrane 208 and/or the support lattice 210 may be formed as part of an additive manufacturing technology or any other suitable process, separately or concurrently with one another. The reticulate membrane 208 and/or the support lattice 210 may additionally or alternatively be formed as part of an additive manufacturing technology separately or concurrently with the acoustic core 200. Additionally, or in the alternative, the reticulate membrane 208 may be combined with the support lattice 210 and/or the acoustic core 200 using an adhesive process, and/or the support lattice 210 may be combined with the reticulate membrane and/or the acoustic core 200 using an adhesive process. Alternatively, the reticulate membrane 208 may be secured to the acoustic screen 202 using an adhesive process. For example, a thermal, sonic, or electric welding process may be used. As another example, diffusion bonding may be used. Alternatively, an adhesive formulation such as a thermosetting or pressure sensitive adhesive or an adhesive tape may be used to secure the reticulate membrane 208 to the support lattice 210. Such an adhesive process may also be used to secure the support lattice and/or the reticulate membrane 208 to the acoustic core 200.

Exemplary acoustic screens 202 may include a support lattice 210 with apertures 212 that are sufficiently large so as to provide linear acoustic impedance properties while minimizing or eliminating undesirable dependency on sound pressure level and grazing-flow Mach number. For example, an acoustic screen 202 may include a support lattice 210 with apertures 212 that provide for an open area of at least 20% up to or approaching 100% of the surface area of the resonant space 207, such as an open area from about 20% to about 100%, such as from about 20% to about 90%, such as from about 20% to about 80%, such as from about 20% to about 60%, or such as from about 20% to about 40% of the surface are of the resonant space 207 of the resonant cells 206.

Figure 2A:
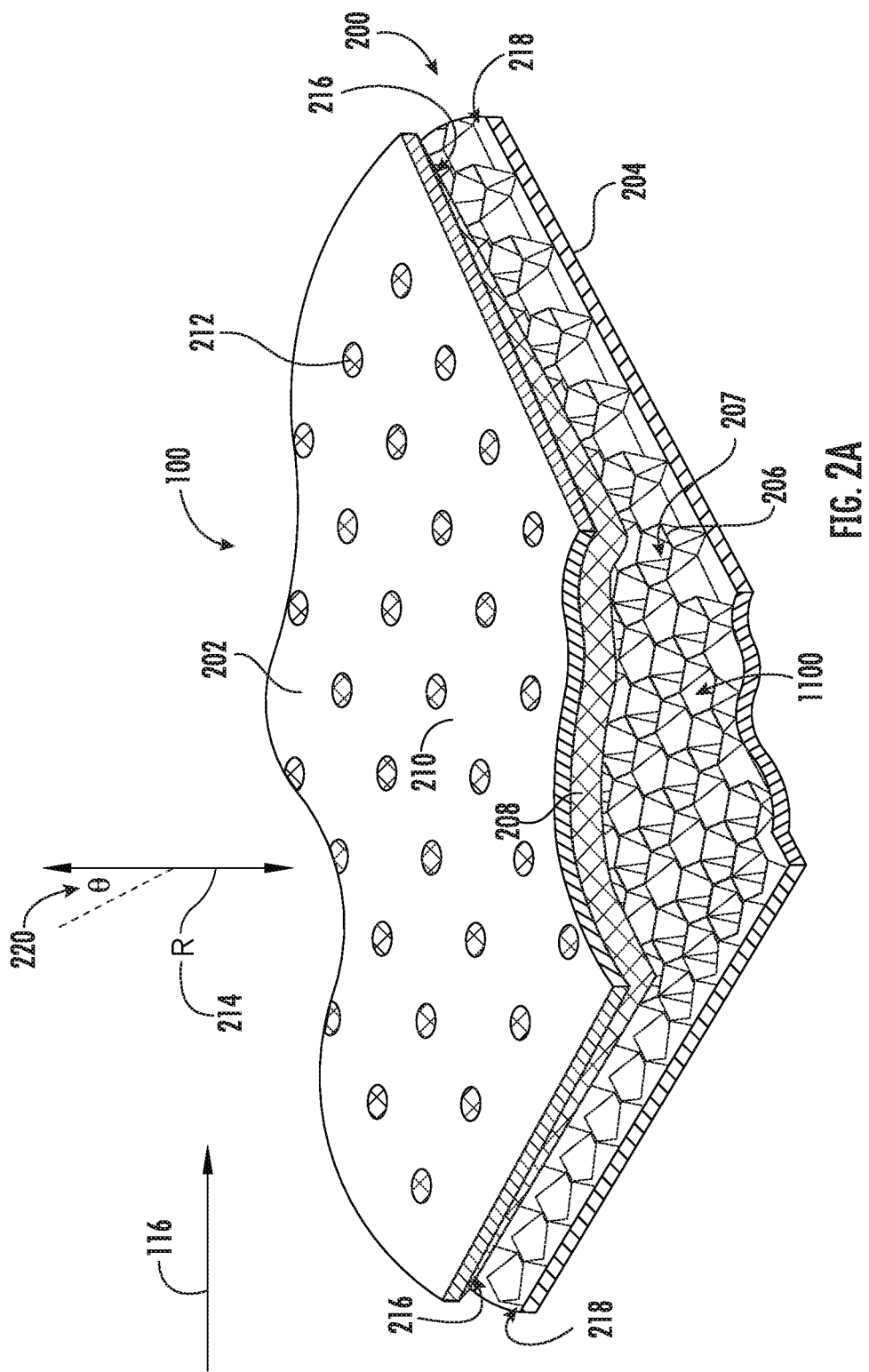
Figure 2D:
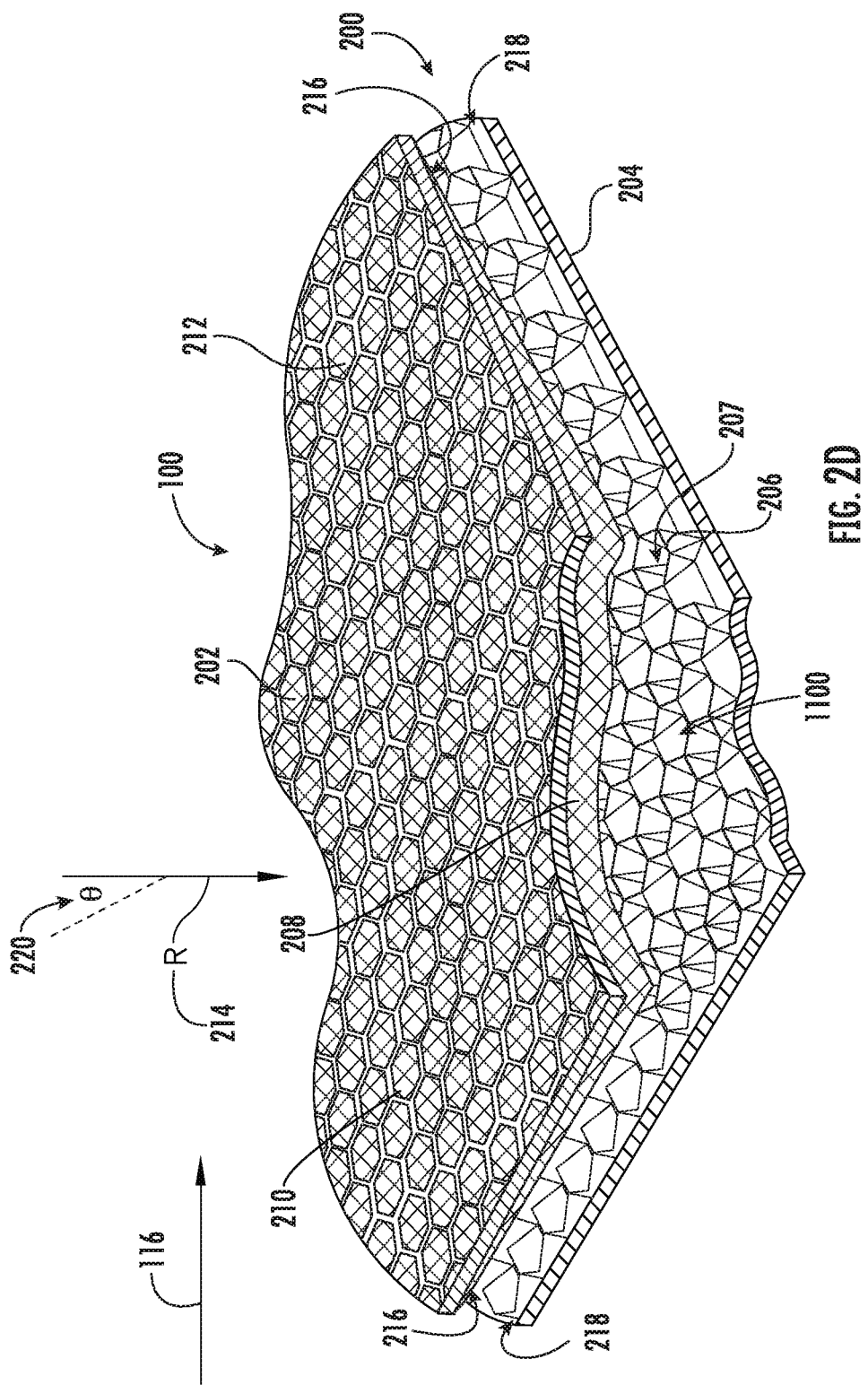

The support lattice 210 may include apertures 212 that have any desired shape, including elliptical and/or polyhedral shaped apertures 212. For example, FIGS. 2A and 2B show exemplary acoustic liners 100 with a support lattice 210 that includes apertures 212 having an elliptical shape, and FIGS. 2C and 2D show exemplary acoustic liners 100 with a support lattice 210 that includes apertures 212 having a polyhedral shape. In some embodiments, the apertures 212 in the support lattice 210 may correspond to the shape of the top face 216 of resonant cells 206. For example, as shown in FIG. 2D, an acoustic liner 100 that has an array of resonant cells 206 with a hexagonal top face 216 may be utilized in combination with an acoustic screen 202 that has a support lattice 210 with corresponding hexagonal shaped apertures 212.

A thickness or height of the acoustic core 200 may be defined by a distance taken along an axis R 214 (also shown in FIG. 1) between an inside surface of the acoustic screen 202 and an inside surface of the back sheet 204. A top face 216 defines a first linear or curved surface of the acoustic core 200 and a bottom face 218 defines a second linear or curved surface of the acoustic core. The top face 216 resides adjacent to and oriented towards the inside surface of the acoustic screen 202, and the bottom face 218 resides adjacent to and oriented towards the inside surface of the back sheet 204. The axis R 214 represents a normal line relative to the normal surface corresponding to the top face 216 and/or the bottom face 218. The axis R may be a radial or other axis as the context requires. In this exemplary embodiment, the terms "inner" and "outer" refer to the orientation of the respective layers in relation to the longitudinal axial centerline 118 shown in FIG. 1.

The acoustic screen 202, the back sheet 204, and the acoustic core 200 may together form an arcuate cylindrical acoustic liner 100 (see, e.g., FIG. 1), a portion of which is shown in FIG. 2A. A noise source (e.g., fan blades 110 of fan rotor 108) is thus positioned within the arcuate cylindrical acoustic liner 100. The acoustic screen 202 of the acoustic liner typically orientates towards the noise source, with the back sheet 204 typically being more distal from the noise source relative to the acoustic screen 202. In an alternative embodiment, the acoustic screen 202, the back sheet 204, and the acoustic core 200 may together form an acoustic liner 100 that has a substantially flat planar profile. For example, and without limitation, an enclosed volume such as a room or an engine casing may contain a noise source such as noisy machinery, and one or more walls or other aspects of such an enclosed volume may be lined with a substantially flat acoustic liner 100.

In still other embodiments, the acoustic screen 202, the back sheet 204, and the acoustic core 200 may together form a complexly curved acoustic liner 100. For example, and without limitation, one or more complexly curved walls or other aspects of a nacelle or a noise source-containing room or space may be at least partially lined with a complexly curved acoustic liner 100, such as shown in FIG. 1. The curve may be configured to correspond to the contour of a mounting location, such as a location 114, 120, 122, 124, 126 within a nacelle 104 of a turbofan engine 102.

Now turning to FIGS. 3A-3H, partial cross-sectional views of exemplary acoustic liners 100 are shown so as to further illustrate features of exemplary acoustic screens 202. The acoustic liners 100 shown in FIGS. 3A-3H include acoustic screens 202 with apertures 212 that are sufficiently large to provide linear acoustic impedance properties while minimizing or eliminating undesirable dependency on sound pressure level and grazing-flow Mach number. For example, the apertures 212 may provide for an open area of at least 20% up to or approaching 100% of the surface area of the resonant space 207. As shown in FIGS. 3A-3D, exemplary acoustic liners 100 may include an acoustic screen 202 that has a reticulate membrane 208 disposed proximal to the acoustic core 200 and the support lattice 210 disposed distal to the acoustic core 200. Additionally, or in the alternative, as shown in FIGS. 3E-3H, exemplary acoustic liners 100 may include an acoustic screen 202 with at least a portion of the support lattice 210 disposed flush with at least a portion of the reticulate membrane 208. For example, as shown, a top surface of the support lattice 210 may be located in substantially even plane with a top surface of the reticulate membrane 208. Also, as shown, at least a portion of the support lattice 210 may pass through or interrupt the reticulate membrane 208.

The acoustic liners 100 shown in FIGS. 3A-3H may reflect embodiments of an acoustic screen 202 in which the acoustic screen 202 includes apertures 212 and resonant cells 206 that have a one-to-one or many-to-one relationship, depending on the orientation of the cross-section depicted. The acoustic liner 100 shown in FIG. 3C reflects a screen 202 with apertures 212 and resonant cells 206 that have a many-to-one relationship.

Figure 3A:
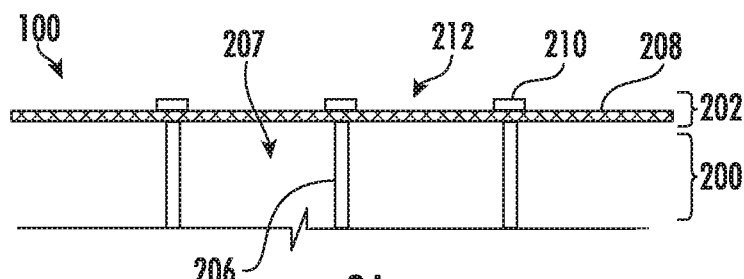
FIGS. 3A-3H schematically depict partial cross-sectional views of exemplary acoustic liners, further illustrating features of exemplary acoustic screens.
Figure 3B:
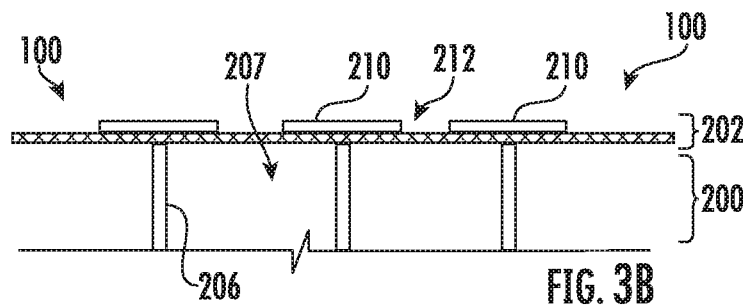
Figure 3C:
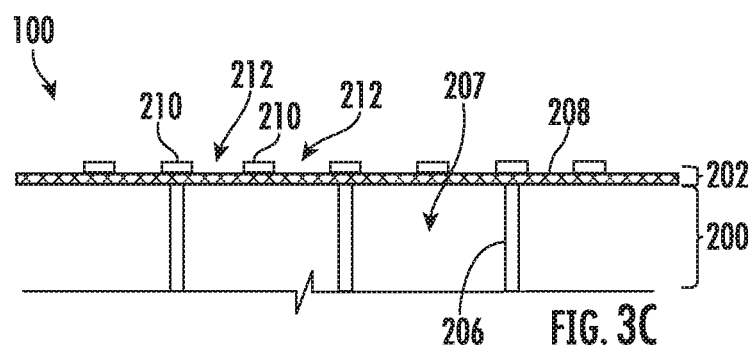
Figure 3D:
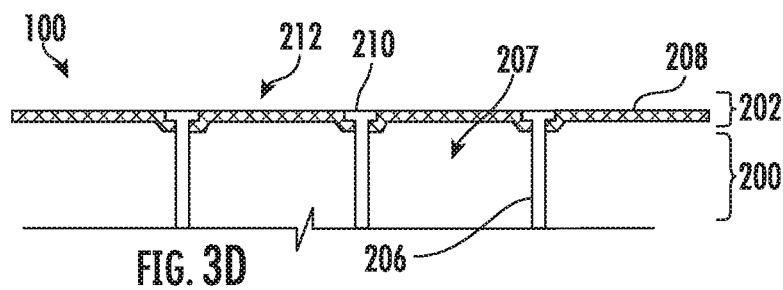
Figure 3E:
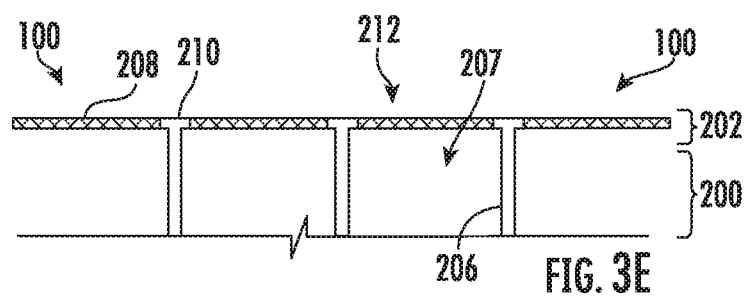
Figure 3F:
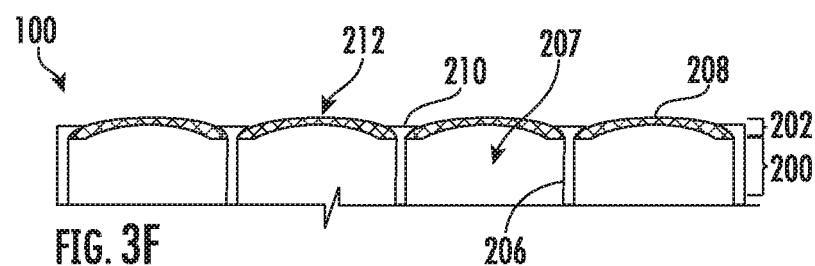

In some embodiments, as shown in FIG. 3D, the support lattice 210 of an acoustic screen 202 may include aspects with a curved surface 300. Such a curved surface 300 may have an aerodynamic profile that reduces drag from grazing flow (such as from air flow 116) and may include convex and/or concave aspects. Additionally, or in the alternative, such a curved surface 300 may include a "Coanda surface," which may direct grazing flow (such as from air flow 116) into a resonant cell immediately downstream. A "Coanda surface" refers to a curved surface that creates a zone of reduced pressure in the immediate proximity of such curved surface. This pressure drop entrains and accelerates fluid along the contour of the surface, which is sometimes referred to as the "Coanda effect." The Coanda effect is the phenomena in which a flow attaches itself to a nearby surface and remains attached even when the surface curves away from the initial direction of the flow. Characteristic of the Coanda effect, accelerating fluid tends to flow over the surface closely, seemingly "clinging to" or "hugging" the surface. As such, a Coanda surface may increase the amount of fluid interacting with the reticulate membrane 208 and passing into the resonant cells 206, thereby increasing fluid interaction with the resonant cells 206, which may lead to increase the acoustic absorption.

Figure 3G:
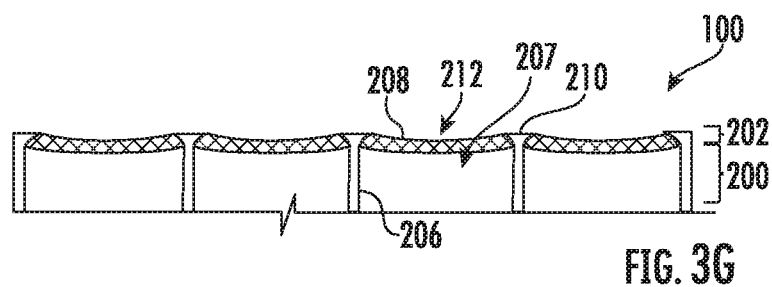
Figure 3H:
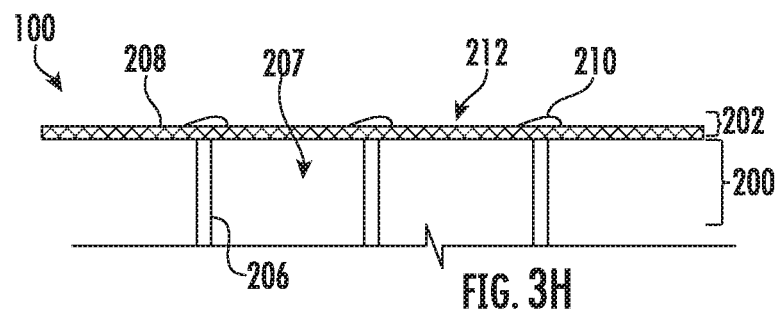

In still further embodiments, as shown in FIGS. 3G and 3H, the reticulate membrane 208 of an acoustic screen 202 may include aspects with a curved surface. A reticulate membrane 208 may include a convex curved surface 302 (FIG. 3G) and/or a concave curved surface 304 (FIG. 3H). Such a convex and/or concave curved surface 302, 304 may have an aerodynamic profile that reduces drag from grazing flow (such as from air flow 116). Additionally, or in the alternative, such a convex and/or concave curved surface 302, 304 may include a Coanda surface, which may direct grazing flow (such as from air flow 116) into a resonant cell 206. A convex curved surface 302 may increase interaction between the reticulate membrane 208 and grazing flow (such as from air flow 116), for example, by protruding the convex portion of the reticulate membrane 208 into the grazing flow (such as from air flow 116). Additionally, a convex curved surface 302 of a reticulate membrane 208 may draw grazing flow (such as from air flow 116) into an adjacent resonant cell 206, for example, by providing a Coanda surface such as at a downstream side of the adjacent resonant cell 206. Such a Coanda surface may direct grazing flow (such as from air flow 116) into the resonant cell 206 along the downstream cell wall, which may introduce sound-attenuating vortices within the resonant cell 206.

While acoustic liners 100 that have a support lattice 210 with a curved surface 300 are described with reference to FIG. 3D, it will be appreciated that a support lattice 210 with a curved surface 300 may be incorporated into any acoustic liner 100 in accordance with the present disclosure. For example, the support lattice 210 of any of the acoustic liners 100 described with reference to FIGS. 1, 2A-2D, and 3A-3H may include aspects with a curved surface 300, all of which are within the scope of the present disclosure. Additionally, while acoustic liners 100 that have a reticulate membrane 208 with a convex or concave curved surface 302, 304 are respectively described with reference to FIGS. 3G and 3H, it will be appreciated that a reticulate membrane 208 with a convex curved surface 302 and/or a concave curved surface 304 may be incorporated into any acoustic liner 100 in accordance with the present disclosure. For example, the reticulate membrane 208 of any of the acoustic liners 100 described with reference to FIGS. 1, 2A-2D, and 3A-3H may include aspects with a convex and/or concave curved surface 302, 304, all of which are within the scope of the present disclosure. An acoustic liner 100 may include resonant cells 206 adjacent to a portion of the reticulate membrane 208 that includes a convex curved surface 302 and/or a concave curved surface 304. Such portion of the reticulate membrane 208 may include a convex curved surface 302, a concave curved surface 304, or both a convex curved surface 302 and a concave curved surface 304. In some embodiments, an acoustic liner may have an acoustic screen 202 with a support member that includes a curved surface 300, as well as a reticulate membrane 208 that includes a convex and/or a concave curved surface 302, 304.

Still referring to FIGS. 3A-3H, in exemplary embodiments, the acoustic core 200, the reticulate membrane 208, and/or the support lattice 210 may be formed using an additive manufacturing technology, which may allow for acoustic screens 202 with novel configuration, geometries, and/or features that avoid certain shortcomings with conventional acoustic liners. Such additive manufacturing technology may be utilized, alone or together with other manufacturing technologies, to provide acoustic liners 100 with configurations as shown.

In exemplary embodiments, an acoustic liner 100 may be formed entirely using an additive manufacturing technology. For example, sequential layers of the acoustic core 200, the reticulate membrane 208, and the acoustic screen 202 may be additively manufactured using a suitable additive manufacturing technology. Such additive manufacturing technology may allow for configurations such as a support lattice 210 disposed flush with at least a portion of the reticulate membrane 208, for example, as shown in FIGS. 3E-3H, as well as acoustic screens 202 that include curved surfaces 300, 302, 304, such as a support lattice 210 with a curved surface 300 and/or a reticulate membrane 208 with a curved surface, such as a concave curved surface 302 and/or a convex curved surface 304. Additionally, additive manufacturing technology may provide for reticulate membranes 208 which have sufficient structure such that the presently disclosed support lattices 210 may be utilized rather than a conventional perforated top sheet.

In some embodiments, a reticulate membrane 208 may be applied to a top face 216 of an acoustic core 200, such as from a roll or sheet of reticulate membrane material, and then a support lattice 210 may be additively printed thereon. The support lattice 210 may penetrate through the reticulate membrane material and integrally bond with the cell walls of the acoustic core 200 as well as the reticulate membrane material, providing an acoustic liner 100 that includes an acoustic core 200 and an acoustic screen 202 integrally formed with one another. Such an integrally formed acoustic liner 100 may include a reticulate membrane 208 integrally formed with a support lattice 210 and the acoustic core 200, as well as a support lattice 210 integrally formed with the acoustic core 200.

In exemplary embodiments, the acoustic core 200, the reticulate membrane 208, and the support lattice 210 may be additively manufactured in such a manner so as to be one and the same component without seams or the like separating elements from one another. However, the reticulate membrane 208 may be recognized by reticulations present therein and the support lattice 210 may be recognized by non-reticulated material disposed above the cell walls of the acoustic core 200 and/or between portions of the reticulate membrane 208.

Figure 4A:
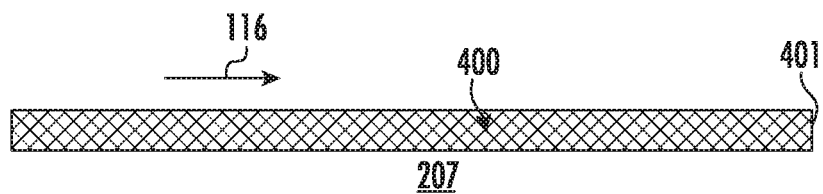
FIGS. 4A-4F schematically depict partial cross-sectional views of exemplary reticulate membranes.
Figure 4B:
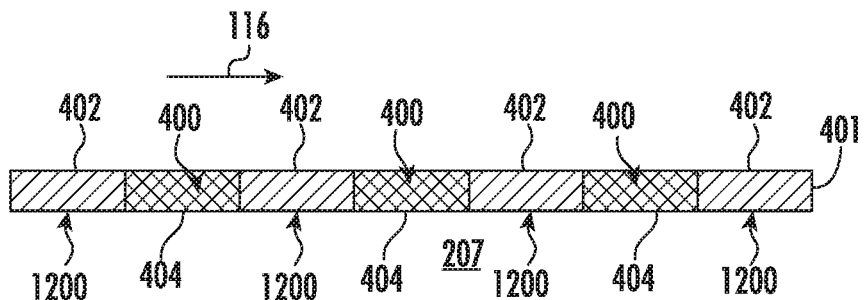
Figure 4C:
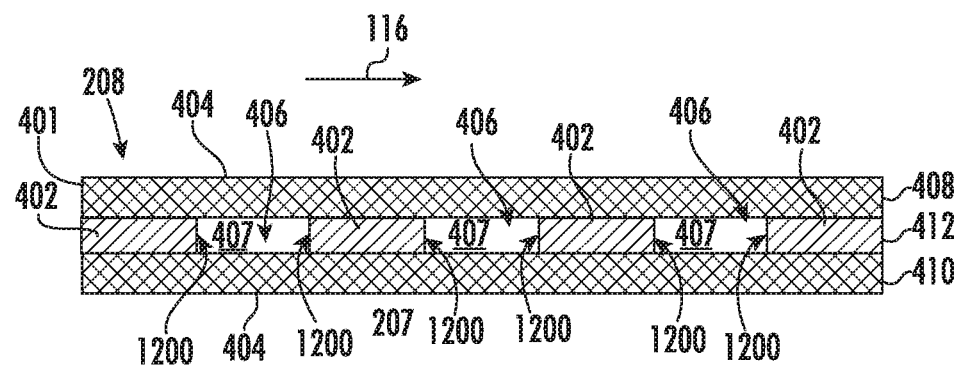

Now turning to FIGS. 4A-4F, exemplary reticulate membrane 208 configurations will be described in further detail. FIGS. 4A-4F show cross-sectional views of exemplary reticulate membraned 208 configurations. As shown in FIG. 4A, a reticulate membrane 208 may include a multitude of reticulations 400 passing through a membrane matrix 401. As shown in FIG. 4B, an exemplary reticulate membrane 208 may include a combination of different materials and/or a combination of reticulate membrane-material configurations. For example, a reticulate membrane 208 may include a first reticulate membrane-material 402 and a second reticulate membrane-material 404. The first reticulate membrane-material 402 may be substantially impervious and the second reticulate membrane-material 404 may include a multitude of reticulations 400. Alternatively, both the first reticulate membrane-material 402 and the second reticulate membrane-material 404 may include a multitude of reticulations 400. In some embodiments, the reticulations 400 in the first reticulate membrane-material 402 may differ from the reticulations 400 in the second reticulate membrane-material 404. For example, the first reticulate membrane-material 402 may include sound-attenuating protuberances 1200 (FIGS. 12A and 12B) and the second reticulate membrane-material 404 may include a multitude of reticulations 400. Such sound-attenuating protuberances 1200 may be located at any portion of the reticulated membrane 208, such as surfaces facing the resonant space 207 of the acoustic core 200.

As shown in FIG. 4C-4F, a reticulate membrane 208 may include intra-membrane resonant cells 406. Such intra-membrane resonant cells 406 may be located between a first reticulate membrane-layer 408 and a second reticulate membrane-layer 410. An intermediate reticulate membrane-layer 412 may define sidewalls of the intra-membrane resonant cells 406. An intra-membrane resonant cells may define an intra-membrane resonant space 407. Sound-attenuating protuberances 1200 may be located at any portion of the reticulated membrane 208, such as surfaces facing the intra-membrane resonant cells 406 and/or surfaces facing the resonant spaces 207 of the acoustic core 200.

Figure 4D:
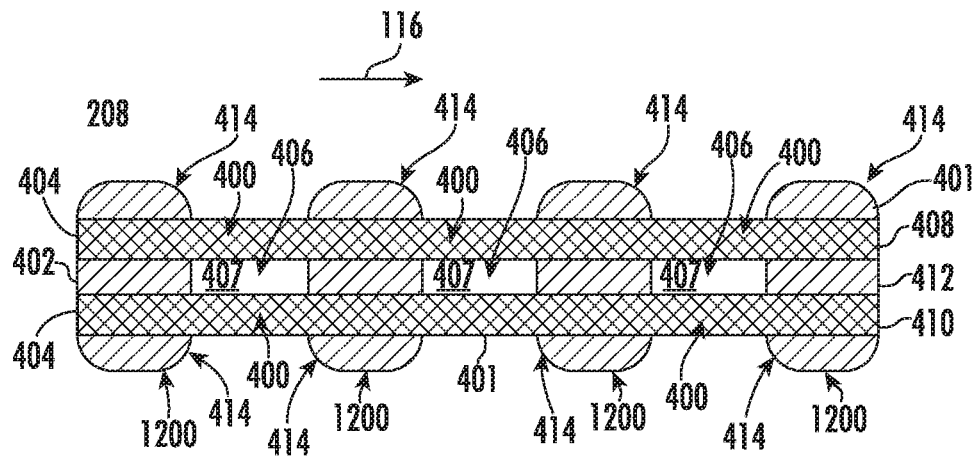

As shown in FIG. 4D, in some embodiments, a reticulate membrane 208 may include intra-membrane curved surfaces 414. The intra-membrane curved surfaces 414 may be oriented outward, so as to interact with grazing flow (such as from air flow 116). An intra-membrane curved surface 414 may increase interaction between the reticulate membrane 208 and grazing flow (such as from air flow 116), for example, by protruding the into the grazing flow. Additionally, or in the alternative, the intra-membrane curved surfaces 414 may be oriented facing inward, so as to interact with fluid in the resonant spaces 207 of the acoustic core 200 and/or so as to interact with fluid in the intra-membrane resonant spaces 407 of the reticulate membrane 208. Such interactions may introduce sound-attenuating vortices within a resonant cell 206 and or an intra-membrane resonant cell 406.

In some embodiments, the intra-membrane curved surfaces 414 may have an aerodynamic profile that reduces drag from grazing flow (such as from air flow 116). While convex aspects are shown, it will be appreciated that the intra-membrane curved surfaces 414 may include convex and/or concave aspects. In some embodiments, the intra-membrane curved surfaces 414 may include a Coanda surface, which may direct grazing flow (such as from air flow 116) through reticulations 400 in the reticulate membrane-material 404 and into an intra-membrane resonant space 407 defined by intra-membrane resonant cell 406, and/or into a resonant space 207 defined by a resonant cell 206.

Figure 4E:
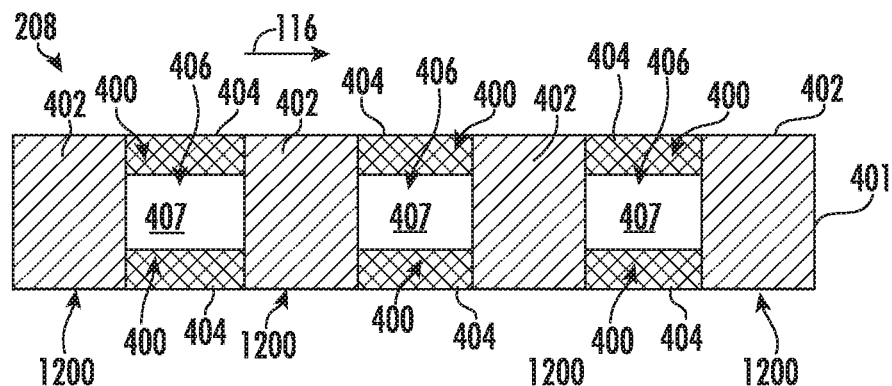
Figure 4F:
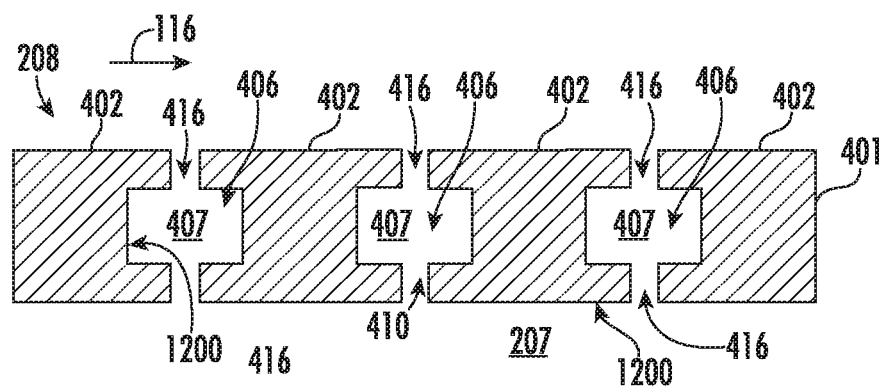

As shown in FIGS. 4E and 4F, in some embodiments, a reticulate membrane 208 may include a first reticulate membrane-material 402, which may be substantially impervious, defining a plurality of intra-membrane resonant cells 406. In some embodiments, as shown in FIG. 4E, a second reticulate membrane-material 404, which may include a multitude of reticulations 400, may define a pathway into and/or out of the intra-membrane resonant cells 406. Alternatively, or in addition, as shown in FIG. 4F, the first reticulate membrane-material 402 may include a plurality of intra-membrane apertures 416 defining a pathway into and/or out of the intra-membrane resonant cells 406. Such intra-membrane apertures 416 may additionally or alternatively define a pathway into and/or out of the resonant cells 206 of the acoustic core 200.

The exemplary reticulate membrane 208 shown in FIGS. 4A-4F may be formed using any desired technology, including an additive manufacturing technology, an adhesive process, a thermal, sonic, or electric welding process, or diffusion bonding, as well as combinations thereof. In some embodiments, a first reticulate membrane-material 402 and a second reticulate membrane-material 404 may be formed using an additive manufacturing technology. Alternatively, a first reticulate membrane-material 402 may be formed using an additive manufacturing technology, and such first reticulate membrane-material 402 may be combined with a second reticulate membrane-material 404 that was formed in a separate process. For example, the first reticulate membrane-material 402 may be additively printed onto the second reticulate membrane-material 404. Alternatively, or in addition, the second reticulate membrane-material 404 may be secured onto the first reticulate membrane-material 402 during and/or after such additive printing.

Figure 5:
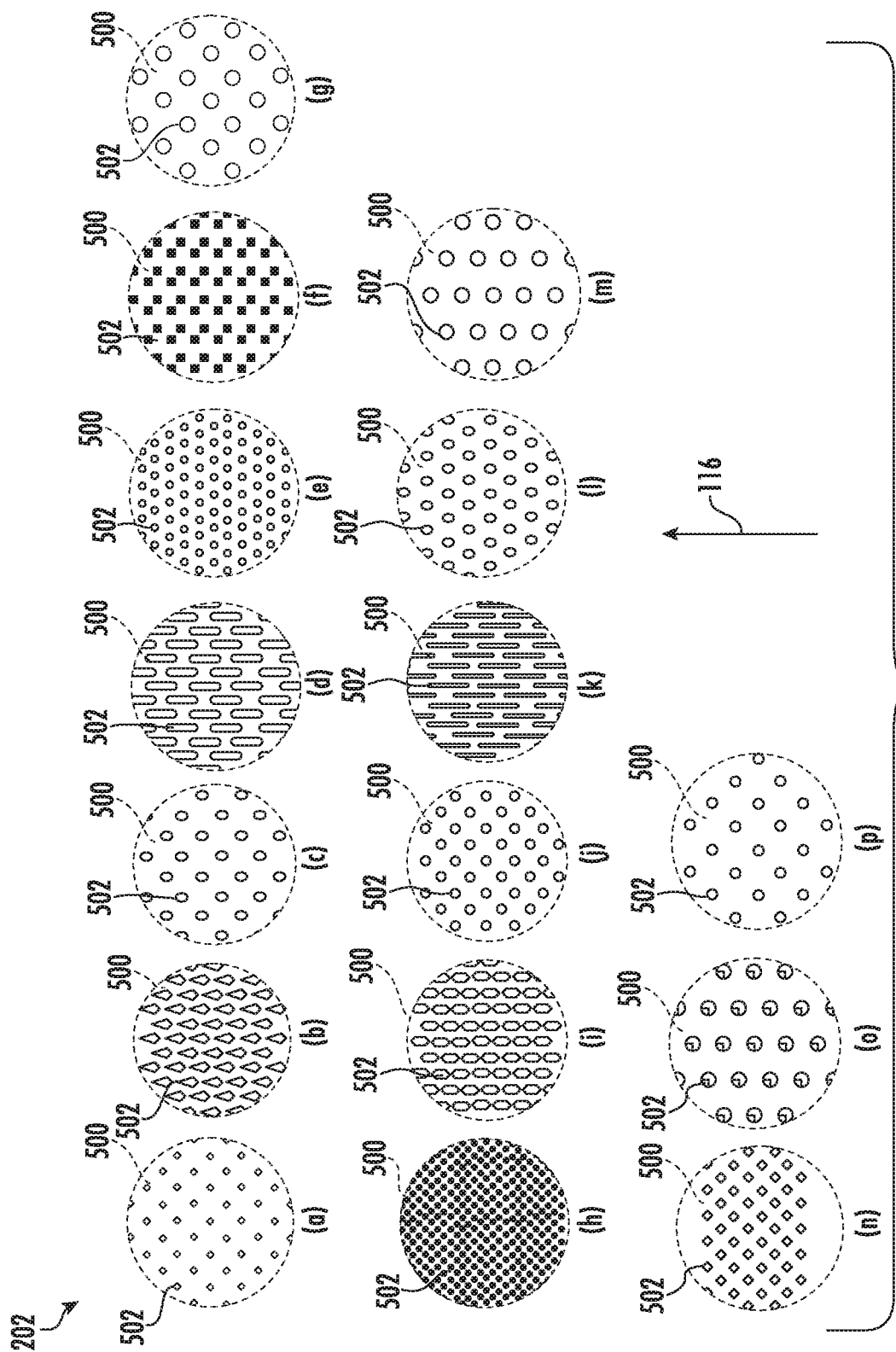
FIG. 5 schematically depicts exemplary configurations for apertures of a support lattice and/or exemplary configurations for reticulations of a reticulate membrane.

Now turning to FIG. 5, exemplary configurations for the apertures 212 of a support lattice 210 and/or configurations for the reticulations 400 of a reticulate membrane 208 are shown, any one or more of which may be incorporated into an acoustic screen 202. Any one or more of the aperture 212 and/or reticulation 400 configurations shown in FIG. 5 may be incorporated into a reticulate membrane 208 and/or a support lattice 210. As shown in FIG. 5, a surface 500 includes a plurality of apertures 212 or reticulations 400 defining a plurality of pathways 502 extending therethrough. The pathways 502 may represent apertures 212 extending through a support lattice 210. Additionally, or in the alternative, the pathways 502 may represent reticulations 400 defined through a reticulate membrane 208. The pathways 502 utilized for the reticulate membrane 208 may differ in configuration and/or orientation from the pathways 502 utilized for the support lattice 210.

The surface 500 and/or the pathways 500 may be formed using an additive manufacturing technology and/or a subtractive manufacturing technology, or a combination thereof. For example, the surface 500 may be formed using an additive manufacturing technology, leaving pathways 502 extending therethrough.

Additionally, or in the alternative, a subtractive process may be used to form pathways 502 extending through the surface 500.

As shown in FIG. 5, exemplary pathways may include polyhedral and/or elliptical cross-sectional shapes. For example, surfaces 500 (a), (b), (c) (e), (f), (h), (i), (j), (l), and (n) include polyhedral pathways 502, and surfaces 500 (d), (g), (k), (m), (o), and (p) include elliptical pathways 502. More particularly, surfaces 500 (a), (e), (f), (h), (j), and (n) includes rectangular pathways 502; surface 500 (b) includes teardrop pathways 502; surfaces 500 (c), (i), and (l) include hexagonal pathways 502; surfaces (d) and (i) include elongate pathways 502; and surfaces (g), (m), (o), and (p) include circular pathways 502. It will be appreciated that combinations of polyhedral and/or elliptical pathways 502 are also within the scope of the present disclosure.

The pathways 502 may be arranged about the surface 502 in any desired orientation, including an ordered or random or semi-random orientation. The pathways 502 may be oriented in an array, including an equidistant array (e.g., as shown with surfaces 500 (a) and (c), having adjacent pathways 502 in perpendicular directions equidistant from one another), or a staggered array (e.g., as shown with surface 500 (l) and (m), having adjacent pathways 502 in perpendicular direction of unequal distance from one another).

Figure 6:
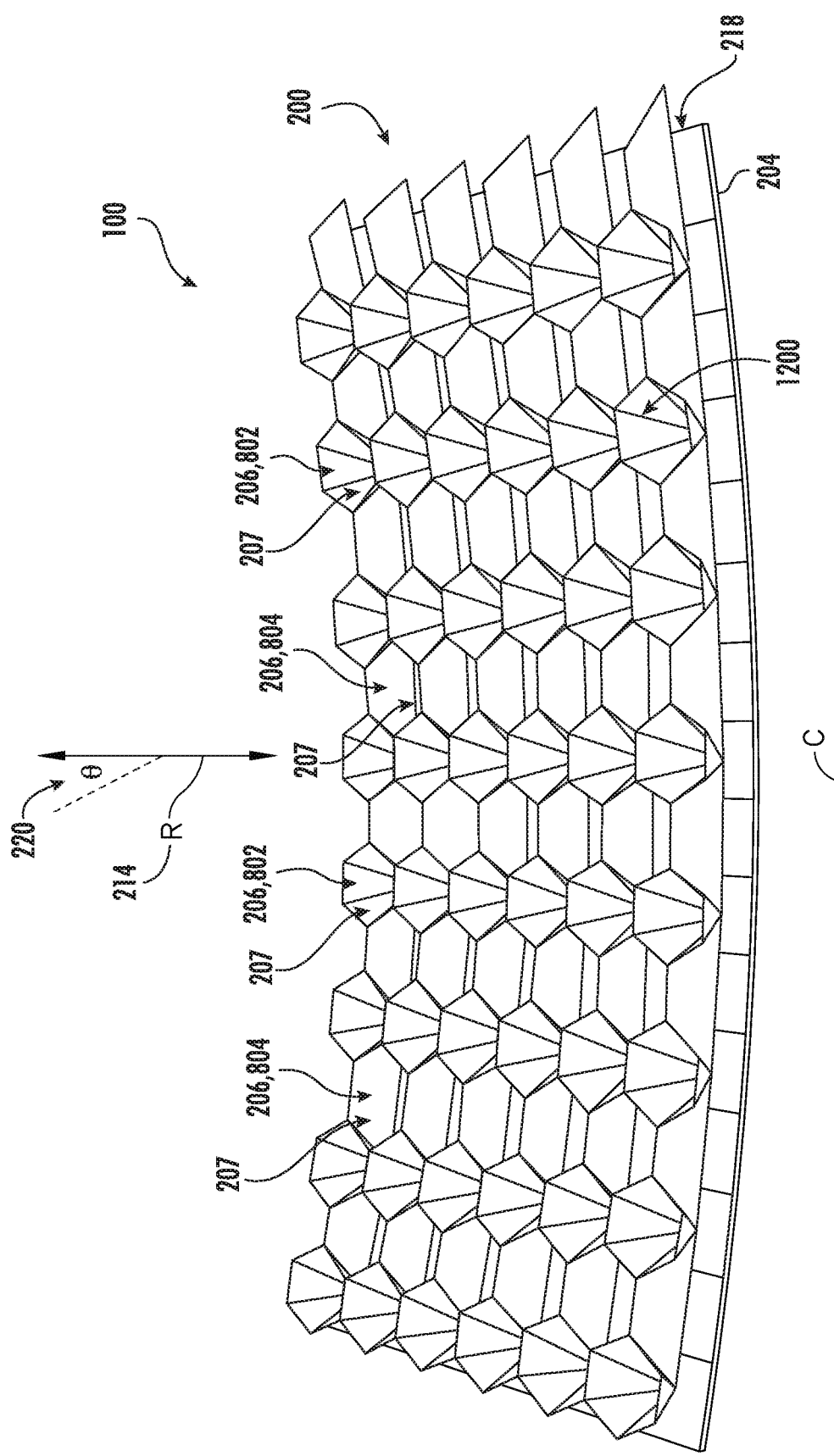
FIG. 6 schematically depict an isometric perspective view of a portion of an exemplary acoustic liner with the acoustic screen removed to reveal an exemplary acoustic core.

Now turning to FIG. 6, exemplary acoustic cores 200 will be described. As mentioned, an acoustic core 200 includes an array of resonant cells 206. The resonant cells 206 may have any polyhedral structures or combination of structures, including parallel polyhedral cellular structures and/or oblique polyhedral cellular structures. In exemplary embodiments, an acoustic core 200, an acoustic screen 202, and a back sheet 204, and may together form a complexly curved acoustic liner 100, which, for example, ay conform to complexly curved walls or other aspects of a nacelle 104 or other noise source-containing room or space may. For example, FIG. 6 shows an exemplary curved acoustic liner 100 with the acoustic screen 202 omitted to further illustrate the acoustic core 200. As mentioned, the curve of the acoustic liner 100 may conform to the contour of a mounting location, such as a location 114, 120, 122, 124, 126 within a nacelle 104 of a turbofan engine 102.

The acoustic cores 200 may include resonant cells 206 with any polyhedral configuration, including parallel polyhedral cellular structures and/or oblique polyhedral cellular structures. Parallel polyhedral cellular structures generally have geometric characteristics reflecting a right prism or a substantially right prism. A right prism refers to a polyhedron composed of an n-sided polygonal top face 216, a bottom face 218 which is a translated copy of the top face 216 without rotation, and n-number of rectangular lateral faces bisected by the top face 216 and the bottom face 218. Given these characteristics of a right prism or substantially right prism, parallel polyhedral cellular structures have lateral faces that are substantially parallel to a normal line 214 represented by an axis R. For example, FIGS. 7A-7C show an acoustic core 200 that has a parallel polyhedral cellular structure.

As shown in FIGS. 7A-7C, the acoustic core 200 has a plurality of polyhedral resonant cells 702 that exhibit geometric characteristics of a hexagonal prism or a "honeycomb" structure. The polyhedral resonant cells 702 have a plurality of lateral polygonal faces 704 bisected by a top face 706 and a bottom face 708. The top face 706 and the bottom face 708 are substantially parallel to one another and have substantially the same surface area as one another. The lateral faces 704 are substantially parallel to the normal line 214 and have a convergence angle θ (theta) 220 of zero or approximately zero. Parallel polyhedral cellular structures, however, are not limited to those structures with identically sized lateral rectangular faces, nor are parallel polyhedral cellular structures limited to those structures with identical internal angles between adjacent lateral rectangular faces. Rather, parallel cellular structures include those structures with differently sized lateral rectangular faces and correspondingly differing internal angles between adjacent lateral rectangular faces. Such parallel cellular structures nevertheless have a top face 706 and a bottom face 708 with substantially the same surface area. Also, it will be appreciated that parallel cellular structures may not exhibit perfect symmetry due to minor imprecision in manufacturing technology and the like leading to imperfect symmetry in the cellular structures.

In contrast with parallel cellular structures, oblique polyhedral cellular structures have polyhedral cells with least one lateral face that either converges or diverges relative to the normal line 214 represented by the axis R at a convergence angle θ (theta) 220 greater than zero degrees. A wide variety of convergence angles and/or divergence angles may be provided. For example, in various embodiments, a convergence angle θ (theta) 220 may fall within a range from greater than zero to 45 degrees, such as from 1 to 10 degrees, such as from 1 to 20 degrees, such as from 1 to 30 degrees, or such as from 1 to 45 degrees. In some embodiments, a convergence angle θ (theta) 220 may fall within a range from 2 to 30 degrees, such as from 2 to 10 degrees, such as from 5 to 15 degrees, such as from 10 to 20 degrees, or such as from 15 to 30 degrees. The convergence angle θ (theta) 220 may be greater than zero degrees, such as greater than 1 degrees, such as greater than 2 degrees, such as greater than 5 degrees, such as greater than 10 degrees, such as greater than 15 degrees, such as greater than 20 degrees, such as greater than 25 degrees, such as greater than 30 degrees, such as greater than 35 degrees, or such as greater than 40 degrees. The convergence angle θ (theta) 220 may be less than 45 degrees, such as less than 40 degrees, such as less than 35 degrees, such as less than 30 degrees, such as less than 25 degrees, such as less than 20 degrees, such as less than 15 degrees, such as less than 10 degrees, such as less than 5 degrees, or such as less than 1 degrees.

The exemplary acoustic core shown in FIG. 6 gives one example of an oblique polyhedral cellular structure. FIGS. 8A-8C show another exemplary oblique polyhedral cellular structure 800. An oblique polyhedral cellular structure 800 includes a plurality of converging polyhedral cells 802, and a plurality of diverging polyhedral cells 804, bisected by a top face 806 and a bottom face 808. As shown, the top face 806 and the bottom face 808 are substantially parallel to one another. Each of the converging polyhedral cells 802 or diverging polyhedral cells 804 have a plurality of lateral polygonal faces 810. These lateral polygonal faces include at least a first lateral face 812 that converges relative to the normal line 214 represented by the axis R at a convergence angle θ (theta) 220 greater than zero degrees. Additionally, or in the alternative, the lateral polygonal faces include at least a first lateral face 812 that converges and/or relative to at least a second lateral face 814. In some embodiments, the first lateral face 812 may additionally or alternatively diverge relative to the normal line 214 and/or relative to at least a third lateral face 816.

The converging polyhedral cells 802 and/or diverging polyhedral cells 804 have asymmetry in respect of at least one such converging or diverging lateral face and/or in respect of a differing cross-sectional area as between two substantially parallel planes that bisect the cell (i.e., the top face 806 and the bottom face 808). The substantially parallel planes of the top face 806 and the bottom face 808 may bisect an oblique polyhedral cell as a plane, as a line, or as a point, depending on the configuration of the particular cell. As a convenience, such a plane, line, or point may sometimes be referred to more generally as a face. For example, the top face 806 bisects both the converging polyhedral cells 802 and the diverging polyhedral cells 804 as a plane, and the bottom face 808 bisects the converging cells 802 as a line and the diverging cells 804 as a plane.

In addition to the exemplary oblique polyhedral cellular structures shown in FIGS. 5 and 8A-8C, an acoustic core may include numerous other oblique polyhedral cellular structures. For example, FIG. 9 shows numerous exemplary oblique polyhedron that may be incorporated into an oblique polyhedral cellular structure in accordance with the present disclosure.

Figure 9:
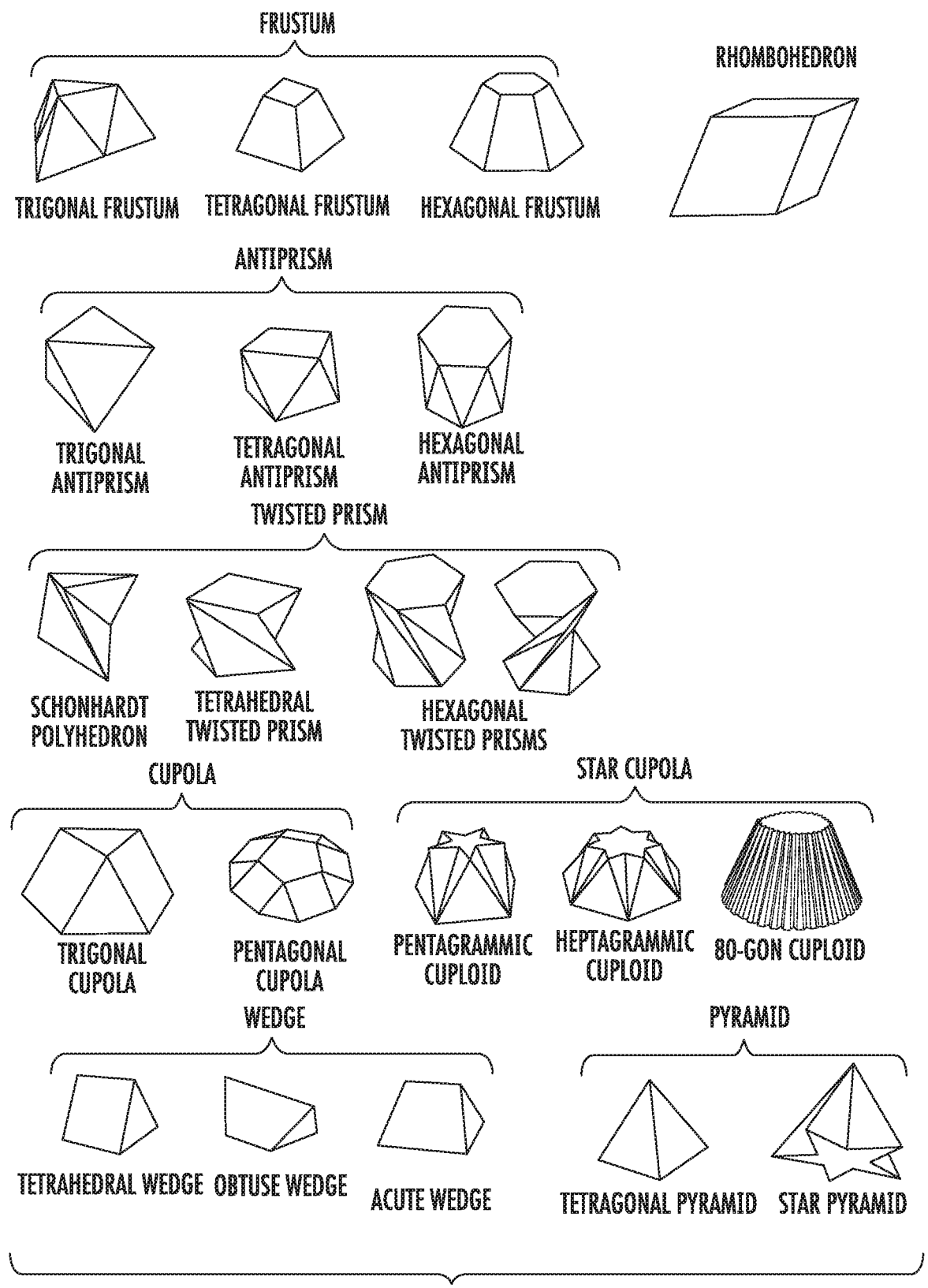
FIG. 9 schematically depicts several additional exemplary oblique polyhedral cells that may be included in an acoustic core.

As shown in FIG. 9, oblique polyhedral cellular structures may include all or a portion of any one or more oblique polyhedron. Exemplary oblique polyhedral cellular structures may include a frustum, a rhombohedron, an antiprism, a twisted prism, a cupola (including a star cupola), a wedge, a pyramid, and combinations or portions of these. By way of example, a frustum may include a trigonal frustum, a tetragonal frustum, a pentagonal frustum, a hexagonal frustum, a heptagonal frustum, an octagonal frustum, a nonagonal frustum, a decagonal frustum, a hendecagonal frustum, a dodecagonal frustum, any other frustal polyhedron, and combinations of these. A frustal polyhedron includes a frustum combined with another polyhedron, including any of the aforementioned frustum shapes combined with another polyhedron. For example, a rhombohedron may be formed from any rhombus, providing a rhombal polyhedron. As a further example, a rhombohedron may be combined with a frustum to form a rhombohedral frustum.

An antiprism includes a polyhedron composed of a polygonal top face 216, a polygonal bottom face 218, and a sequence of adjacent trigonal lateral faces with alternating orientations, bisected by the top face 216 and the bottom face 218. By way of example, an antiprism may include a trigonal antiprism, a tetragonal antiprism, a hexagonal antiprism, an antiprismal polyhedron, and combinations of these. An antiprismal polyhedron includes an antiprism combined with another polyhedron. In some embodiments, an antiprism may include an n-sided top face 216 and an n-sided bottom face 218. Alternatively, an antiprism may include an n-sided top face 216 and a bottom face 218 with greater than or less than n-sided.

A twisted prism includes a polyhedron composed of a polygonal top face 216, a polygonal bottom face 218, and a plurality of lateral faces including at least some lateral faces bisected on a diagonal, with the top face 216 and the bottom face 218 twisted relative to one another, causing at least some adjacent lateral faces to be concave relative to one another. By way of example, a twisted prism may include a Schönhardt polyhedron, a tetrahedral twisted prism, a hexagonal twisted prism, a twisted prismal polyhedron, and combinations of these. A twisted prism has one or more lateral faces bisected on an adjacent diagonal or on a subsequent diagonal. For example, FIG. 9 shows a hexagonal twisted prism with lateral faces bisected on an adjacent diagonal, and a hexagonal twisted prism with lateral faces bisected on a second diagonal. A twisted prismal polyhedron includes a twisted prism combined with another polyhedron.

A cupola includes a polyhedron composed of a polygonal top face 216, a polygonal bottom face 218, and a plurality of lateral faces including an alternating sequence of trigonal lateral faces and tetragonal lateral faces. In some embodiments, a cupola has a top face 216 with twice as many edges as that of its bottom face 218, or vice versa. By way of example, a cupola includes a trigonal cupola, which has a tetragonal top face 216 and a hexagonal bottom face 218, or a hexagonal top face 216 and a tetragonal bottom face 218; and a pentagonal cupola, which has a pentagonal top face 216 and a decagonal bottom face 218, or vice versa. A cupola also includes star cupola, which is a cupola in which tetragonal lateral faces are replaced with adjacent concave trigonal lateral faces. Star cupola include a pentagrammic cuploid and a heptagrammic cuploid. A pentagrammic cuploid has a pentagonal bottom face 218 and a pentagrammic top face 216, or vice versa. A heptagrammic cuploid has a heptagonal top face 216 and a heptagrammic bottom face 218, or vice versa. As a further example, a cupola includes cuploidal configurations with numerous lateral faces, including configurations which approach frustoconical as the number of lateral faces increases. For example, a cupola includes an octacontagon, which has eighty lateral faces. A cupola also includes a cuploidal polyhedron, which includes a cupola or cuploid combined with another polyhedron.

A wedge includes a polyhedron with a polygonal top face 216 and a plurality of polygonal lateral faces that converge into a line. By way of example, a wedge may include a tetrahedral wedge, an obtuse wedge, an acute wedge, and a wedged polyhedron, and combinations of these. A tetrahedral wedge has two trigonal lateral faces and two tetragonal lateral faces. The lateral faces are bisected by a tetragonal plane on one side and converge into a line on the other. An obtuse wedge converges into a line that is wider than the opposing tetragonal plane. An acute wedge converges into a line that is narrower than the opposing tetragonal plane. A wedged polyhedron includes a wedge combined with another polyhedron.

A pyramid includes a polyhedron with a polygonal base bisected by a plurality of trigonal lateral faces that converge into a point. By way of example, a pyramid includes a tetragonal pyramid composed of a tetragonal face bisected by four trigonal lateral faces which converge into a point. A pyramid also includes a star pyramid, composed of a star polygonal base and a plurality of trigonal lateral faces that converge into a point. As an example, a star pyramid includes a pentagonal star pyramid.

Any one or more of these oblique polyhedral configurations (including combinations or portions thereof) may be included in various exemplary oblique cellular structures. In one aspect, the converging polyhedral cells 802 shown in FIGS. 8A-8C reflect aspects of an antiprism combined with aspects of a wedge. For example, the converging polyhedral cells 802 include a polygonal (hexagonal) top face 806, and similar to an antiprism, a plurality of trigonal lateral faces bisected by a bottom face 808. Similar to a wedge, the bottom face 808 has the form of a line. In another aspect, the converging polyhedral cells 802 reflect aspects of a "flipped antiprism," that is, an antiprism that has been twisted 180-degrees about its vertical axis. The converging polyhedral cells 802 have been flipped or twisted at their midpoints 703. The diverging polyhedral cells 804 reflect aspects of an antiprism combined with aspects of a frustum and/or a cupola. For example, the diverging polyhedral cells 804 include a polygonal (hexagonal) top face 806, bisected by a plurality of lateral faces, which similar to an antiprism have a plurality of adjacent trigonal lateral faces, but also with an alternating sequence of trigonal lateral faces and tetragonal lateral faces similar to a cupola.

The acoustic core 200 may be formed of polymeric materials (e.g., a thermoplastic material or elastomeric polymers), synthetic fibers, metal alloys, or composite materials, and may be formed as part of an additive manufacturing technology or any other suitable process, separately or concurrently with the reticulate membrane 208 and/or the support lattice 210. Additionally, the back sheet 204 may be formed of any one or more such materials, as part of an additive manufacturing technology or any other suitable process, separately or concurrently with the acoustic core 200, the reticulate membrane 208 and/or the support lattice 210. Alternatively, the acoustic core 200 may be secured between the acoustic screen 202 and the back sheet 204 using an adhesive process. For example, a thermal, sonic, or electric welding process may be used. As another example, diffusion bonding may be used. Alternatively, an adhesive formulation such as a thermosetting or pressure sensitive adhesive or an adhesive tape may be used to secure the acoustic core 200 in position. Additionally, acoustic cores may be formed from any other suitable technology and/or material known in the art, all of which are within the scope of the present disclosure.

Exemplary polymeric materials may include thermoplastic materials, and/or thermosetting materials. Exemplary thermosetting materials include, for example, epoxies, resins, acrylics, phenolics, polyesters, polyurethanes, polyimides, polyamide-imides (PAI), polysiloxanes bismaleimides, cyanate esters, phenolics, benzoxazines, phthalonitriles. Exemplary thermoplastic materials include, for example, acrylonitrile butadiene styrene (ABS), polyesters, polyamide-imides (PAI), polyetherimide (PEI), polyphenylsulfone (PPSF), polycarbonate (PC), polylactic acid (PLA), high-impact polystyrene (HIPS), thermoplastic polyurethane (TPU), aliphatic polyamides (nylon), polyaryletherketone (PAEK), polyetherketoneketone (PEKK), or polyether ether ketone (PEEK), as well as combinations thereof.

Exemplary synthetic fibers include extruded polymer filaments such as polyetherimide (PEI), polycarbonate, acrylonitrile, acrylonitrile-butadiene-styrene, aramid fiber, meta-aramid fiber, para-aramid fiber, polyethylene fiber, rayon, polyester, or nylon, as well as combinations of these.

Exemplary metal alloys include aluminum alloys, steel alloys, titanium alloys, or nickel alloys (e.g., superalloys, such as austenitic nickel-chromium-based superalloys), as well as combinations of these.

Exemplary composite materials include ceramic matrix composite (CMC) materials and/or polymer matrix composite (PMC) materials. CMC materials include a ceramic matrix material and reinforcing fibers or cloth. Exemplary ceramic matrix materials include silicon carbide (SiC) and/or carbon (C). Exemplary CMC materials include carbon-fiber-reinforced carbon (C/C), carbon-fiber-reinforced silicon carbide (C/SiC), or silicon-carbide-reinforced silicon carbide (SiC/SiC). PMC materials include a polymeric matrix material and reinforcing fibers or cloth. Exemplary PMC materials include fiber-reinforced plastics and advanced composites. Exemplary polymeric matrix materials include thermosets, such as epoxies, phenolics, polyurethanes, polyimides, bismaleimides, cyanate esters, phenolics, benzoxazines, phthalonitriles. In some embodiments, polyimides may be particularly suitable. Exemplary polyimides include phenylethynyl-terminated imide (PETI) oligomers, biphenyl dianhydride-based 2,2'-dimethylbenzidine, ultrahigh-temperature HFPE. In some embodiments, exemplary polyimides may include end caps, such as 4-phenylethynylphthalic anhydride (PEPA) and/or asymmetric oxydipthhalic anhydride (a-ODPA) end caps.

Exemplary reinforcing fibers or cloth that may be utilized in CMC or PMC materials include carbon fibers, ceramic fibers, fiberglass, graphite fibers, and aramid fibers. Exemplary reinforcing fibers include monofilaments, yarns, chopped whiskers or fibers, and/or particles. In some embodiments, ceramic fibers may be formed of materials such a silicon carbide (SiC), carbon fiber (C), sapphire, alumina silicates, and/or oxides of Si, Al, Zr, Y, as well as combinations thereof. The reinforcing fibers may additionally include inorganic fillers, such as silica, quartz, pyrophyllite, wollastonite, mica, talc, kyanite, and/or montmorillonite, as well as combinations thereof.

Any suitable additive manufacturing technology may be utilized to manufacture various aspects of the presently disclosed acoustic liners 100. Exemplary additive manufacturing technologies include, but are not limited to: directed energy deposition (DED) systems, such as chemical vapor deposition (CVD) systems, laser metal deposition (LMD) systems, directed metal deposition (DMD) systems, laser engineered net shape (LENS) systems, electron beam additive melting (EBAM) systems, or rapid plasma deposition (RPD) systems; powder bed fusion (PBF) systems, such as direct metal laser melting (DMLM) systems, electron beam melting (EBM) systems, directed metal laser sintering (DMLS) systems, selective laser melting (SLM) systems, or selective laser sintering (SLS) systems; laminated object manufacturing (LOM) systems, such as ultrasonic manufacturing (UAM) systems; mater extrusion (ME) systems, such as fused deposition modeling (FDM) systems or fused filament fabrication (FFF) systems; material jetting (MJ) systems, such as smooth curvatures printing (SCP) systems, multi jet modeling (MJM) systems; and 3D printing, such as by inkjets and laserjets, including binder jetting (BJ) systems; photopolymer jetting (PJ) systems, stereolithographic (SLA) systems, and hybrid processes (HP).

Other suitable technologies that may be used to manufacture various aspects of the presently disclosed acoustic liners 100 include, without limitation, forming (e.g., rolling, stamping, joining, etc.), extruding (e.g., sheet extruding), subtractive manufacturing (e.g., machining, drilling, laser cutting, etc.), forging or casting, as well as a combination thereof, or any other manufacturing technology. As shown in Now turning to FIGS. 10A-10D and 11A-11D, in some embodiments, an acoustic core 200 may be manufactured using a folded core technology, which may utilize core material strips 1000. A folded core technology may include adhering a plurality of core material strips 1000 to one another at a multitude of adherence regions 1002 located at selected length intervals along respective core material strips 1000. A folded core technology may additionally include expanding the core material strips 1000 from one another at a multitude of expansion regions 1004 respectively located between the multitude of adherence regions 1002.

In one embodiment, the acoustic core 200 shown in FIGS. 8A-8C may be formed using folded core technology, providing a folded acoustic core 1006. By way of illustration, FIG. 10A shows a converging polyhedral cell 802 from the acoustic core 200 shown in FIGS. 8A-8C, projected onto a two-dimensional space, and FIG. 10B shows a diverging polyhedral cell 804 from the acoustic core shown in FIGS. 8A-8C projected onto a two-dimensional space. A plurality of core material strips 1000 may be configured as shown in FIGS. 10A and/or 10B. For example, a plurality of core material strips 1000 configured as shown in FIGS. 10A and/or 10B may be linked together in an alternating pattern, as shown in FIG. 10C. A plurality of core material strips 1000 configured as shown in FIG. 10C may be used to form a folded acoustic core 1006 as shown in FIG. 10D. As shown in FIG. 10C, the core material strip 1000 include a plurality of fold lines 1008 configured to form an oblique polyhedral cellular structure 800 with a plurality of converging polyhedral cells 802, and a plurality of diverging polyhedral cells 804, bisected by a top face 806 and a bottom face 808.

FIGS. 11A-11D show another exemplary folded acoustic core 1006. FIG. 11A shows a side view of a core material strip 1000 with a plurality of fold lines 1008. A plurality of core material strips 1000 configured as shown in FIG. 11A may be utilized to form a folded acoustic core 1006 as shown in FIGS. 11B-11D. The resulting folded acoustic core 1006 shown in FIGS. 11B-11D includes an oblique polyhedral cellular structure 1001 with a plurality of converging polyhedral cells 1102, and a plurality of diverging polyhedral cells 1104, bisected by a top face 1106 and a bottom face 1108.

Core material strips 1000 such as those shown in FIGS. 10C and 11A may be cut from a supply such as a roll. Core material strips 1000 such as those shown in FIG. 10C, which have generally circular configuration prior to folding, may be spooled around a roll edge-wise. Core material strips 1000 such as those shown in FIG. 11A, which have a generally linear configuration prior to folding, may be spooled around a roll length-wise. Several core material strips 1000 may be selectively adhered to one another at a multitude of adherence regions 1002 located at selected length intervals along respective core material strips 1000. Rolls of core material may be cut to provide core material strips 1000, which may be folded and/or expanded apart from one another at a multitude of expansion regions 1004 respectively located between the multitude of adherence regions 1002. When folded and/or expanded, the core material strips 1000 may form an acoustic core 200 having any desired profile, including a substantially flat planar profile, a curved planar profile, or a complexly curved planar profile. The desired profile may be provided by selectively configuring the core material strips 1000, for example, so as to correspond to the contour of a mounting location, such as a location 114, 120, 122, 124, 126 within a nacelle 104 of a turbofan engine 102. As further examples, the core material strips 1000 in their unfolded state may exhibit a generally circular configuration (FIG. 10C), a generally linear configuration (FIG. 11A), curvilinear configuration, an elliptical configuration, a spiral configuration, or a wavy or oscillating configuration, as well as combinations of these.

It will be appreciated that in some embodiments it may be advantageous to avoid waste or unused material when cutting core material strips 1000 from a larger supply of core material. In some embodiments, core material strips 1000 having a circular, spiral, or curvilinear configuration may result in waste or unused material. However, in some embodiments core material strips 1000 can be cut from a larger supply of core material such as a roll to provide oblique polyhedral cellular structures that reduce waste material. For example, in some embodiments oblique polyhedral cells may be cut from wavy or oscillating core material strips 1000 configured such that the respective edges of subsequently cut strips 1000 align with one another Additionally, in some embodiments oblique polyhedral cells may be cut from linear core material strips 1000.

Figure 12A:
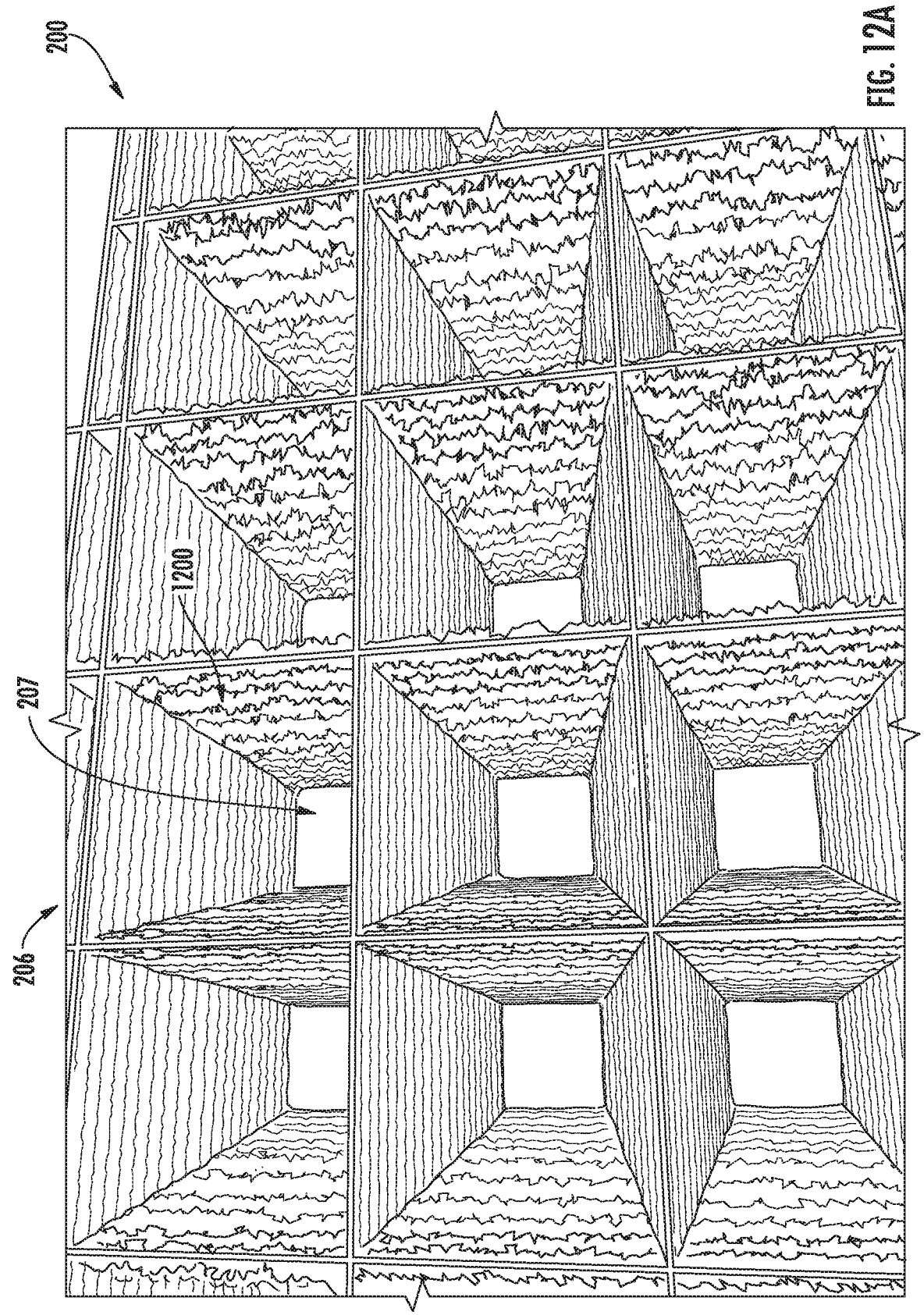
FIGS. 12A and 12B schematically depict an exemplary acoustic core that has sound-attenuating protuberances.
Figure 12B:
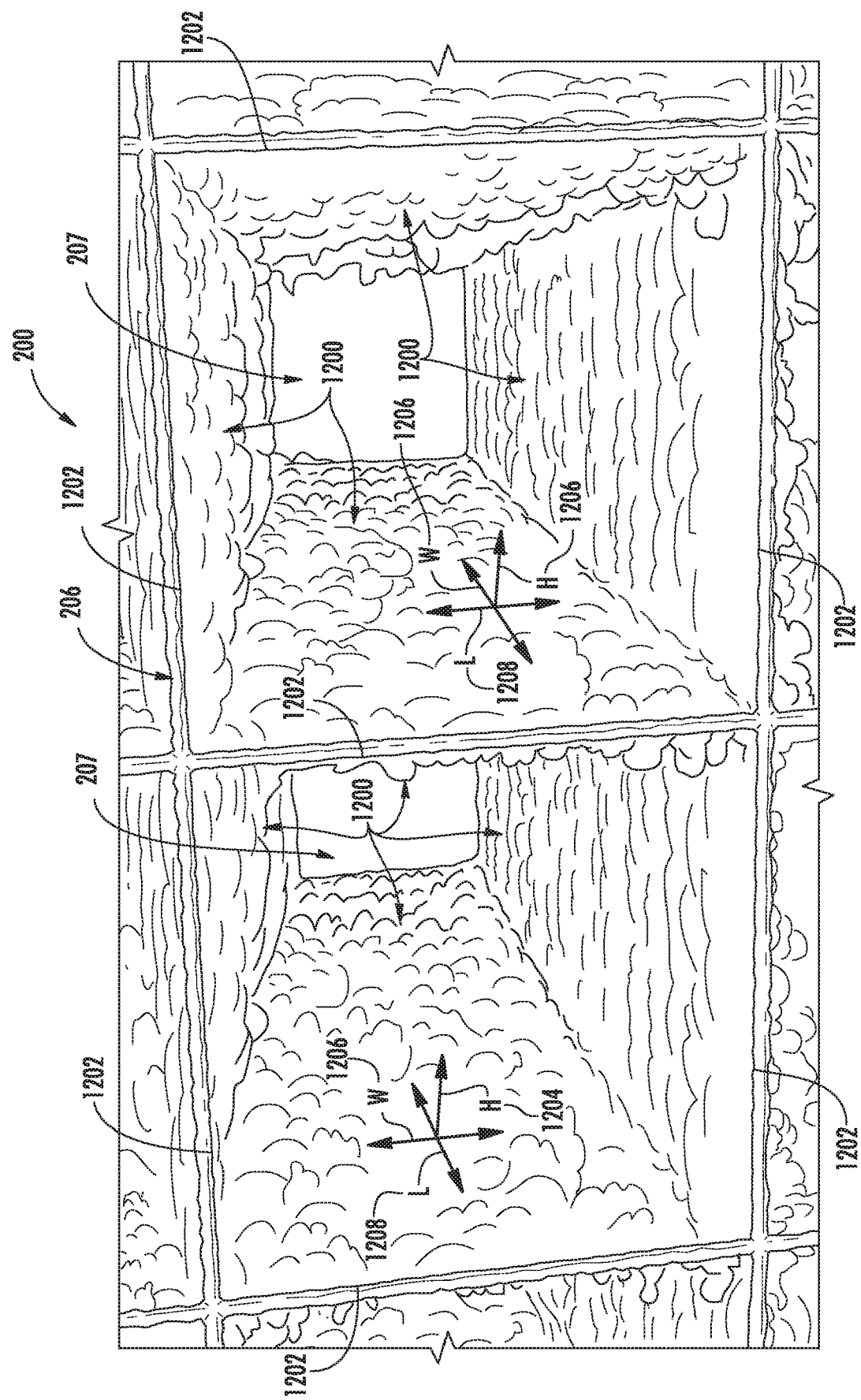

Now turning to FIGS. 12A and 12B, in some embodiments, exemplary acoustic cores 200 may include resonant cells 206 with sound-attenuating protuberances 1200. The sound-attenuating protuberances 1200 may be integrally formed with the cell walls of the acoustic core 200. Any one or a combination of additive manufacturing technologies may be used to additively-manufacture an acoustic core 200 with sound-attenuating protuberances 1200. The integral formation of the sound-attenuating protuberances 1200 may be intentionally incidental to the formation of the acoustic core 200 using the additive manufacturing technology. By intentionally incidental, it is meant that the multitude of sound-attenuating protuberances 1200 would not typically be formed integrally with the acoustic core 200 when using the additive manufacturing technology, but that intentional modifications to the additive manufacturing technology as described herein causes the multitude of sound-attenuating protuberances 1200 to be incidentally formed as an intended integral feature of the acoustic core 200.

The intentionally incidental nature of the sound-attenuating protuberances 1200 or the formation thereof may provide for a random or semi-random orientation and/or size of sound-attenuating protuberances 1200 over at least a portion of the acoustic core 200, such as at least a portion of the cell walls making up the resonant cells 206 of the acoustic core 200. This random or semi-random orientation and/or size may not necessarily be achievable by other means, such as directly additively manufacturing each individual protuberance 1200. For example, in some embodiments, at least a portion of the sound-attenuating protuberances 1200 may have one or more dimensions (e.g., height, width, and/or length) that are smaller than a corresponding minimum dimensional resolution provided for by the additive manufacturing technology utilized to produce the acoustic core 200.

As shown in FIGS. 12A and 12B, exemplary resonant cells 206 may include a multitude of sound-attenuating protuberances 1200 protruding into the resonant space 207 from a nominal surface 1202 of the cell walls. As shown, the resonant cells 206 have sound-attenuating protuberances 1200 across the entirety of the cell walls. However, to realize a benefit to sound attenuation, the sound-attenuating protuberances 1200 need not necessarily be provided across the entirety of the cell walls, nor across every cell wall, nor on every resonant cell 206 of an array. In fact, in some embodiments improved sound attenuation may be realized by providing sound-attenuating protuberances 1200 across only a particular area of a cell wall, across only a portion of the cell walls, and across only a portion of an array. Likewise, a corresponding remainder of a cell wall, portion of cell walls, or portion of an array of resonant cells 206 may have no sound-attenuating protuberances at all. Thus, in accordance with the present disclosure, at least some of the resonant cells 206 may have a multitude of sound-attenuating protuberances 1200.

The sound-attenuating protuberances 1200 take the form of the additive manufacturing material of the cell walls integrally protruding into the resonant space 207 with a random or semi-random orientation about at least a portion of the cell walls. Exemplary sound-attenuating protuberances 1200 may include any one or more of a combination of protuberant features having a variety of shapes and configurations, including nodules, loops, hooks, bumps, burls, clots, lumps, knobs, projections, protrusions, swells, enlargements, outgrowths, accretions, blisters, juts, and the like. These sound-attenuating protuberances 1200 occur in a random or semi-random fashion as a product of the particular manner in which the resonant cells 206 are formed. However, the particular configuration, arrangement, or orientation of the sound-attenuating protuberances 1200 may be selectively controlled or modified by adjusting the manner in which the resonant cells 206 are formed.

Regardless of their shape, sound-attenuating protuberances 1200 may be provided in any desired size. The sound-attenuating protuberances 1200 protrude from the nominal surface 1202 of a cell wall in respect of a height (h) 1204, a width (w) 1206, and a length (l) 1208. In some embodiments, a multitude of sound-attenuating protuberances 1200 may have an average height, width, and/or length of from about 5 to 10,000 micrometers. The size of the sound-attenuating protuberances 1200 may be selected based on the desired sound-attenuation properties of the resonant cells 206.

A multitude of sound-attenuating protuberances 1200 may have an average height, (h) 1204 of from about 5 to 10,000 micrometers, as measured from the nominal surface 1202 of the cell wall from which the sound-attenuating protuberances 1200 protrude. For example, the average height 1204 of the sound-attenuating protuberances 1200 may be from about 10 μm to 5,000 μm, such as from about 10 μm to 1,000 μm, such as from about 10 μm to 500 μm, such as from about 10 μm to 500 μm, such as from about 25 μm to 300 μm such as from about 50 μm to 200 μm, or such as from about 75 μm to 150 μm. The multitude of sound-attenuating protuberances 1200 may have an average height 1204 of 10,000 μm or less, such as 5,000 μm or less, such as 1,000 μm or less, such as 500 μm or less, such as 500 μm or less, such as 300 μm or less, such as 200 μm or less, such as 100 μm or less, such as 75 μm or less, such as 50 μm or less, such as 25 μm or less, or such as 10 μm or less. The multitude of sound-attenuating protuberances 1200 may have an average height 1204 of 10 μm or more, such as 25 μm more, such as 50 μm more, such as 75 μm more, such as 100 μm more, such as 150 μm more, such as 200 μm more, such as 300 μm, more, such as 500 μm more, such as 500 μm more, such as 1,000 μm more, or such as 5,000 μm more.

A multitude of sound-attenuating protuberances 1200 may have an average width, (w) 1206 of from 5 to 500 micrometers, as measured laterally across the surface of the cell wall from which the sound-attenuating protuberances 1200 protrude. For example, the average width 1206 of the sound-attenuating protuberances 1200 may be from 10 μm to 5,000 μm, such as from 10 μm to 1,000 μm, such as from 10 μm to 500 μm, such as from 10 μm to 500 μm, such as from 25 to 300 μm such as from 50 μm to 200 μm, such as from 75 μm to 150 μm. The multitude of sound-attenuating protuberances 1200 may have an average width 1206 of 10,000 μm or less, such as 5,000 μm or less, such as 1,000 μm or less, such as 500 μm or less, such as 500 μm or less, such as 300 μm or less, such as 200 μm or less, such as 100 μm or less, such as 75 μm or less, such as 50 μm or less, such as 25 μm or less, or such as 10 μm or less. The multitude of sound-attenuating protuberances 1200 may also have an average width 1206 of 10 μm or more, such as 25 μm more, such as 50 μm more, such as 75 μm more, such as 100 μm more, such as 150 μm more, such as 200 μm more, such as 300 μm more, such as 500 μm more, such as 500 μm more, such as 1,000 μm more, or such as 5,000 μm more.

A multitude of sound-attenuating protuberances 1200 may have an average length, (l) 1208 of from 5 to 500 micrometers, as measured longitudinally along the surface of the cell wall from which the sound-attenuating protuberances 1200 protrude. For example, the average length 1208 of the sound-attenuating protuberances may be from 10 μm to 5,000 μm, such as from 10 μm to 1,000 μm, such as from 10 μm to 500 μm, such as from 10 μm to 500 μm, such as from 25 μm to 300 μm such as from 50 μm to 200 μm, or such as from 75 μm to 150 μm. The multitude of sound-attenuating protuberances 1200 may have an average length 1208 of 10,000 μm or less, such as 5,000 μm or less, such as 1,000 μm or less, such as 500 μm or less, such as 500 μm or less, such as 300 μm or less, such as 200 μm or less, such as 100 μm or less, such as 75 μm or less, such as 50 μm or less, such as 25 μm or less, or such as 10 μm or less. The multitude of sound-attenuating protuberances 1200 may have an average length 1208 of 10 μm or more, such as 25 μm more, such as 50 μm more, such as 75 μm more, such as 100 μm more, such as 150 μm more, such as 200 μm more, such as 300 μm more, such as 500 μm more, such as 500 μm more, such as 1,000 μm more, or such as 5,000 μm more.

Now referring to FIGS. 13A and 13B, an exemplary embodiment of intentionally incidental formation of sound-attenuating protuberances 1200 will be described. An additive manufacturing technology may be configured to orient an additive manufacturing tool with respect to a toolpath 1300. Typically, the toolpath 1300 follows a contour that occupies a two-dimensional space, however a toolpath 1300 may alternatively be orientated with respect to a contour that occupies a three-dimensional space. In either case, an acoustic core 200 may be formed in sequential contours applied one on top of another, separated by a contour interval. Each sequential contour may be formed by orienting the additive manufacturing tool with respect to a toolpath, such that the acoustic core 200 is formed by additive manufacturing material bonding or otherwise being solidified in a domain 1201 occupied by the respective contours. The domain 1201 corresponding to a respective contour includes a three dimensional volume defined by the contour interval, the space occupied by the contour. It will be appreciated that any acoustic core 200 may be formed in the manner described herein so as to integrally form sound-attenuating protuberances 1200 on at least a portion of the acoustic core 200. In that regard, the acoustic cores 200 described herein are provided by way of example only and not in a limiting sense. Further, in addition to acoustic cores 200, it may be desirable to provide sound-attenuating protuberances 1200 on other surfaces of an acoustic liner 100, including a reticulate membrane 208, a support lattice 210, or a back sheet 204, as well as combinations of these, all of which are within the spirit and scope of the present disclosure.

As shown in FIG. 13A, an additive manufacturing tool is oriented with respect to a toolpath 1300 that includes a plurality of toolpath passes. For example, the toolpath 1300 may include a first toolpath pass 1302 and a second toolpath pass 1304, which may each represent a portion of the toolpath 1300. The plurality of toolpath passes (e.g., the first toolpath pass 1302 and the second toolpath pass 1304) overlap one another at a toolpath overlap zone 1306. In some embodiments, sound-attenuating protuberances 1200 may be formed by the introduction of additional additive manufacturing material to the acoustic core 200. The additional additive manufacturing material may be introduced to the acoustic core 200 within the toolpath overlap zone 1306. Additionally, or in the alternative, additional additive manufacturing material may be introduced at a location outside of the toolpath overlap zone 1306, such as a region of the acoustic core 200 adjacent to the toolpath overlap zone.

Regardless of where the additional additive manufacturing material is introduced, as shown in FIG. 13B, the overlapping toolpath passes cause a portion of the additive manufacturing material to be introduced to the acoustic core 200 in the form of incidental protuberances 1200 protruding from the wall of the acoustic core 200. These protuberances 1200 have sound-attenuating properties, and as such, are referred to herein as sound-attenuating protuberances 1200. The incidental nature with which the sound-attenuating protuberances 1200 are formed gives the sound-attenuating protuberances 1200 a random or semi-random orientation. The size, shape, and/or configuration of the sound-attenuating protuberances 1200 and/or the existence thereof may depend at least in part on the extent of overlap as between the plurality of toolpath passes in the toolpath overlap zone 1306.

The extent of the overlap as between two toolpath passes (e.g., the first toolpath pass 1302 and the second toolpath pass 1304) in the toolpath overlap zone 1306 may be described with reference to a toolpath gap 1308, which describes a distance between a first pass centerline 1310 and a second pass centerline 1312. The toolpath gap 1308 may be described in relation to a toolpath pass width 1314 and/or a contour width 1316. A toolpath pass width 1314 refers to the average width of a toolpath pass, such as the first toolpath pass 1302, without regard to the presence of sound-attenuating protuberances 1200. A contour width 1316 refers to the average width of a plurality of toolpath passes defining the toolpath overlap zone 1306, such as that of the first toolpath pass 1302 and the second toolpath pass 1304, without regard to the presence of sound-attenuating protuberances 1200. In some embodiments, the amount of additional additive manufacturing material introduced to the acoustic core 200 may be proportional to the toolpath gap 1308.

The integral formation of the sound-attenuating protuberances 1200 may depend on providing a toolpath gap 1308 of sufficient size so as to introduce to the acoustic core 200 sufficient additional additive manufacturing material. The size of the toolpath gap 1308 may be described with reference to a toolpath gap ratio, which refers to a ratio of the contour width 1316 to the toolpath pass width 1314. In some embodiments, the amount of sound additional additive manufacturing material introduced may be depend at least in part on the toolpath gap ratio. The particular toolpath gap ratio that may be suitable for a given acoustic core 200 may be selected by evaluating the sound-attenuation properties of the sound-attenuating protuberances 1200 resulting therefrom.

A toolpath gap ratio may range from 1.0 to less than 2.0. A toolpath gap ratio of 1.0 corresponds to fully overlapping toolpath passes. A toolpath gap ratio of 2.0 corresponds to adjacent and abutting toolpath passes that do not overlap. In some embodiments, sound-attenuating protuberances 1200 may be integrally formed by providing a toolpath gap ratio from 1.0 to less than 2.0, such as from 1.1 to 1.9, such as from 1.1 to 1.8, such as from 1.1. to 1.5, such as from 1.1 to 1.3, such as from 1.2 to 1.7, such as from 1.5 to 1.9, such as from 1.5 to 1.7. The toolpath gap ratio may be 1.0 or more, such as 1.1 or more, such as 1.2 or more, such as 1.3 or more, such as 1.4 or more, such as 1.5 or more, such as 1.6 or more, such as 1.7 or more, such as 1.8 or more, or such as 1.9 or more. The toolpath gap ratio may be less than 2.0, such as less than 1.9, such as less than 1.8 such as less than 1.7, such as less than 1.6, such as less than 1.5, such as less than 1.4, such as less than 1.3, such as less than 1.2, or such as less than 1.1.

Sequential contours of an acoustic core 200 that includes sound-attenuating protuberances 1200 may be formed by orienting the additive manufacturing tool with respect to sequential toolpaths 1300. The sequential contours may be applied on top of one another, incrementing in a stepwise manner to additively build the acoustic core 200. All or a portion of the sequential toolpaths 1300 may include overlapping toolpath passes providing for a toolpath overlap zone 1306. However, it is not necessary that every toolpath 1300 provide for a toolpath overlap zone 1306, and it also is not necessary that a toolpath overlap zone 1306 exist with respect to the entirety of a toolpath 1300. In fact, the toolpath overlap zone 1306 may be present in an intermittent or variable manner. Additionally, or in the alternative, additional additive manufacturing material may be introduced within the toolpath overlap zone 1306 in an intermittent or variable manner. As examples, an additive manufacturing tool may follow a variable or irregular toolpath 1300 or toolpath passes such that the toolpath overlap zone 1306 exhibits a variable or irregular nature. As further examples an additive manufacturing tool may cause the introduction of additive manufacturing material to occur in a variable or irregular manner, such as by cycling a tool speed or material introduction rate.

The specific nature in which sound-attenuating protuberances 1200 are integrally formed in an intentionally incidental manner may depend on the particular additive manufacturing technology used. Additive manufacturing technologies may be grouped by the nature of the input from the additive manufacturing tool. For example, an additive manufacturing tool may introduce an additive manufacturing material and/or a beam of additive energy to additively manufacture an acoustic core 200. The additive manufacturing material may be an amorphous material such as a powder, a liquid, a gel, a polymer, etc. The additive manufacturing technology includes conforming the amorphous material to a solid acoustic core 200 through a process such as melting, fusing, curing, etc.

Additive manufacturing technologies which utilize an additive manufacturing tool that introduces an additive manufacturing material are sometimes referred to herein as additive material technologies. Additive material technologies includes material extrusion (e.g., fused deposition modeling (FDM), fused filament fabrication (FFF), etc.), material jetting (MJ) (e.g., smooth curvatures printing (SCP), multi jet modeling (MJM), etc.), binder jetting (BJ), and directed energy deposition (DED) (e.g., laser metal deposition (LMD), laser engineered net shaping (LENS), directed metal deposition (DMD), etc.).

In the case of material extrusion, the additive manufacturing material may be provided in the form of a filament. The filament may include a thermoplastic material or a ceramic material, for example. In the case of material jetting (MJ), the additive manufacturing material may include a photosensitive material, such as a thermosetting material. The photosensitive material may be supplied in the form of a liquid, gel, or the like, and may solidify when exposed to an additive energy source such as ultraviolet light. In the case of binder jetting (BJ), the additive manufacturing material may include a binder material which is jetted into a bed of powder material. The binder material may be applied in the form of a liquid, gel, or the like. Exemplary binder materials include thermosetting materials or thermoplastic materials. Exemplary powder material for binder jetting (BJ) may include, for example, metal or metal alloys, thermoplastic materials, and ceramics. In the case of directed energy deposition (DED), the additive manufacturing material may be provided in the form of a wire, a filament, or powder. Exemplary material for directed energy deposition (DED) may include, for example, metal or metal alloys, thermoplastic materials, and ceramics.

Additive manufacturing technologies which utilize an additive manufacturing tool that introduces a beam of additive energy to solidify (e.g., melt, fuse, cure, etc.) an amorphous additive manufacturing material (e.g., a powder, a liquid, a gel, etc.) are sometimes referred to herein as additive energy technologies. Additive energy technologies include powder bed fusion (PFB) (e.g., selective laser sintering (SLS), direct metal laser sintering (SLM), laser melting (LM), electron beam melting (EBM), selective heat sintering (SHS), multi-let fusion (MJF), etc.), and vat photopolymerization (e.g., stereolithography apparatus (SLA), digital light processing (DLP), scan, spin, and selectively photocure (3SP), continuous liquid interface production (CLIP), etc.). In the case of powder bed fusion (PFB), the additive manufacturing material may be provided in the form of a powder. Exemplary powder material for powder bed fusion (PFB), may include, for example, metal or metal alloys, polymeric materials (e.g., thermosetting materials and/or thermoplastic materials), and ceramics. In the case of vat photopolymerization, the additive manufacturing material may include a photosensitive material. Exemplary photosensitive materials that may be utilized with additive manufacturing technologies (e.g., additive material technologies or additive energy technologies) include a formulation containing, for example, a binder, a monomer, and a photoinitiator. Exemplary binders include styrenes, methacrylates, vinyl alcohols, olefins, glycerols, and propylenes. Exemplary monomers include acrylic acids, methacrylic acids, isodecyl acryalates, and N-vinyl pyrrolidone. Exemplary photoinitiators include free radical photoinitiators such as isopropylthioxanthone, benzophenone, and 2,2-azobizisobutyronitrile, and cationic photoinitiators such as diaryliodonium salts and triarylsulfonium salts.

In some embodiments, sound-attenuating protuberances 1200 may be integrally formed in an intentionally incidental manner using an additive material technology. One suitable additive material technology includes fused deposition modeling (FDM) or fused filament fabrication (FFF), however other additive material technologies also may be used. With an additive material technology, the additive manufacturing tool introduces an additive manufacturing material to the acoustic core 200. The overlapping toolpath passes cause an excess of additive manufacturing material to be introduced into a domain 1201 occupied by the contour defined by the toolpath 1300. As additional contours are applied to the acoustic core 200, adjacent contours force excess additive manufacturing material outward from the respective contours, causing incidental protuberances 1200 of additional additive manufacturing material to be intentionally formed with a random or semi-random orientation. For example, with fused deposition modeling (FDM) or fused filament fabrication (FFF), excess material is extruded and deposited in the overlapping toolpath passes, causing an accumulation of excess material in the toolpath overlap zone 1306, forcing extruded material outward from the respective contours. The additive manufacturing material making up the protuberances 1200 may come from any portion of the additive manufacturing material, including any one or more toolpaths 1300 and/or any one or more toolpath passes 1302, 1304, and including material originating from within or outside of the toolpath overlap zone 1306. In some embodiments, at least a portion of the sound-attenuating protuberances 1200 may have one or more dimensions that are smaller than a corresponding minimum dimensional resolution provided for by the additive manufacturing technology used to produce the acoustic core 200. For additive material technologies, the dimensional resolution may be defined by the dimensions of the material introduced. For example, with fused deposition modeling (FDM) or fused filament fabrication (FFF), the dimensional resolution may be defined by the cross-sectional dimension of filaments as extruded during the fused deposition modeling process.

In some embodiments, sound-attenuating protuberances 1200 may be integrally formed in an intentionally incidental manner using an additive energy technology. One suitable additive energy technology includes selective laser sintering (SLS), however, other additive energy technologies also may be used. With an additive energy technology, the additive manufacturing tool introduces a beam of additive energy to the acoustic core 200, which solidifies an amorphous additive manufacturing material. The overlapping toolpath passes causes excess of additive energy to be introduced into a domain 1201 occupied by the contour defined by the toolpath 1300. This excess energy propagates outward from the respective contours, causing incidental protuberances 1200 of additional additive manufacturing material to be intentionally formed with a random or semi-random orientation. For example, with selective laser sintering (SLS), heat generated by a laser melts a powder material. To form sound-attenuating protuberances 1200, excess laser energy is intentionally introduced by providing overlapping toolpath passes, and this excess laser energy incidentally melts adjacent powder particles outside of the domain 1201 occupied by the respective contours with a random or semi-random orientation. In some embodiments, at least a portion of the sound-attenuating protuberances 1200 may have one or more dimensions that are smaller than a corresponding minimum dimensional resolution provided for by the additive manufacturing technology used to produce the acoustic core 200. For additive energy technologies, the dimensional resolution may be defined by the cross-sectional dimensions of the amorphous additive manufacturing material and/or the cross-sectional dimensions of the beam of additive energy. For example, with selective laser sintering (SLS), the dimensional resolution may be defined by the cross-sectional dimension of the particles of the amorphous additive manufacturing material and/or the cross-sectional dimension of the laser beam used to melt the particles. As another example, for vat photopolymerization, the dimensional resolution may be defined by the cross-sectional dimension of a laser or other energy beam used to cure the photopolymer.

In some embodiments, sound-attenuating protuberances 1200 may be integrally formed using a combination of additive material technology and additive energy technology. For example, it will be appreciated that directed energy deposition (DED) utilizes an additive manufacturing tool that introduces both an additive manufacturing material and an additive energy. Additionally, or in the alternative, different additive manufacturing technologies may be combined with one another, such as by using different additive manufacturing technologies for different portions of an acoustic core 200, and/or by using different additive manufacturing technologies simultaneously, sequentially, or otherwise in combination, to integrally form sound-attenuating protuberances 1200 in an acoustic core 200.

Now referring to FIG. 14, it will be appreciated that every toolpath or toolpath pass need not overlap to form sound-attenuating protuberances 1200. For example, as shown in FIG. 14, one or more external contours 1400 that define cell walls may include overlapping toolpath passes so as to form sound-attenuating protuberances 1200 (FIGS. 12A and 12B) on the cell walls, while one or more internal contours 1402 that define internal structure may not necessarily have overlapping toolpath passes. However, it will be appreciated that some nominal overlap may be provided, such as for the purpose of sufficiently bonding domains 1201 of additive manufacturing material corresponding to adjacent toolpaths. Yet, such nominal overlap typically would not form sound-attenuating protuberances 1200 as described herein apart from providing a sufficient toolpath gap ratio.

Figure 15:
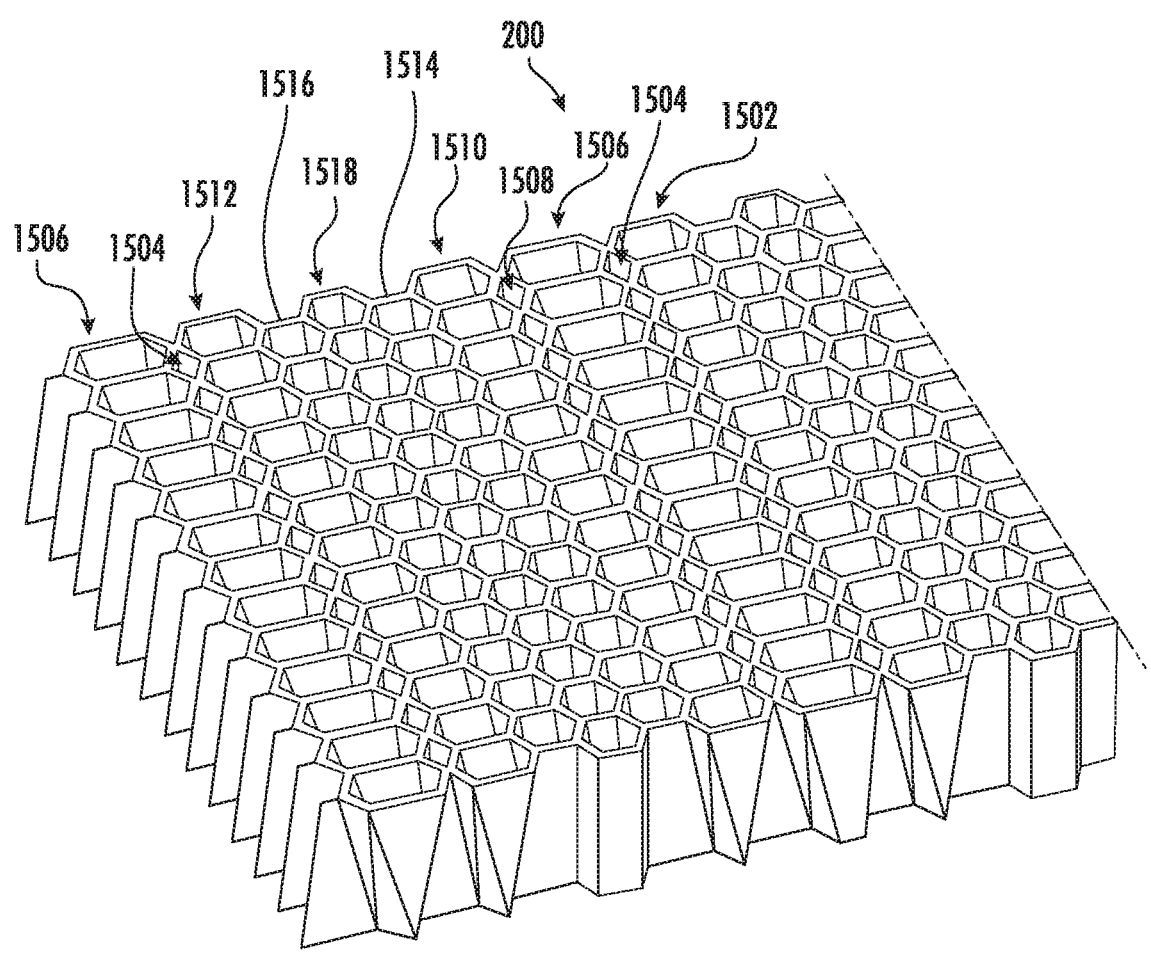
FIG. 15 schematically depicts a perspective view of an acoustic core that has a combination of parallel and oblique polyhedral cellular structures.

The present disclosure provides numerous configurations for cellular structures that may be included in an acoustic core 200. It will be appreciated that numerous additional configurations are within the spirit and scope of the present disclosure. In some embodiments, an array of resonant cells 206 may include a combination of differently configured polyhedral cells. The combination may include both oblique polyhedral cells and parallel polyhedral cells, and various different configurations of these. For example, FIG. 15 shows a perspective view of an exemplary acoustic core 200 that has a combination of differently configured cells. As shown in FIG. 15, an acoustic core 200 may include converging polyhedral cells 1502 having a first configuration and diverging polyhedral cells 1504 having a first configuration. The acoustic core 200 shown in FIG. 15 further includes converging polyhedral cells 1506 having a second configuration and diverging polyhedral cells 1508 having a second configuration. As shown, in some embodiments an acoustic core 200 may further include converging polyhedral cells 1510 having a third configuration, and in some embodiments may even include further converging polyhedral cells 1512 having a fourth configuration. Additionally, or in the alternative, an acoustic core 200 may further include diverging polyhedral cells 1514 having a third configuration, and in some embodiments may even include further diverging polyhedral cells 1516 having a fourth configuration. In some embodiments, an acoustic core 200 also may include parallel polyhedral cells 1518. The parallel polyhedral cells may be combined with oblique polyhedral cells in any desired configuration. For example, as shown in FIG. 15, the parallel polyhedral cells may be adjacent to converging cells 1514, 1516. Alternatively, or in addition, parallel polyhedral cells may be adjacent to diverging cells.

Now turning to FIGS. 16A-16C, exemplary methods 1600 of forming an acoustic liner 100 will be described. Exemplary methods 1600 may include forming an acoustic core 200 and/or forming an acoustic screen 202. Additionally, or in the alternative, the acoustic core 200 and/or the acoustic screen 202 may be provided separately and utilized in the exemplary methods 1600. For example, an exemplary method 1600 may include attaching an acoustic screen 202 to an acoustic core 200, forming an acoustic screen 202 and attaching the acoustic screen 202 to an acoustic core 200, forming an acoustic core 200 and attaching the acoustic core 200 to an acoustic screen 202, or forming an acoustic screen 202 and an acoustic core 200 and attaching the acoustic screen 202 to the acoustic core 200. In exemplary embodiments, the acoustic screen 202 and the acoustic core 200 may be integrally formed, such as using an additive manufacturing technology.

Figure 16A:
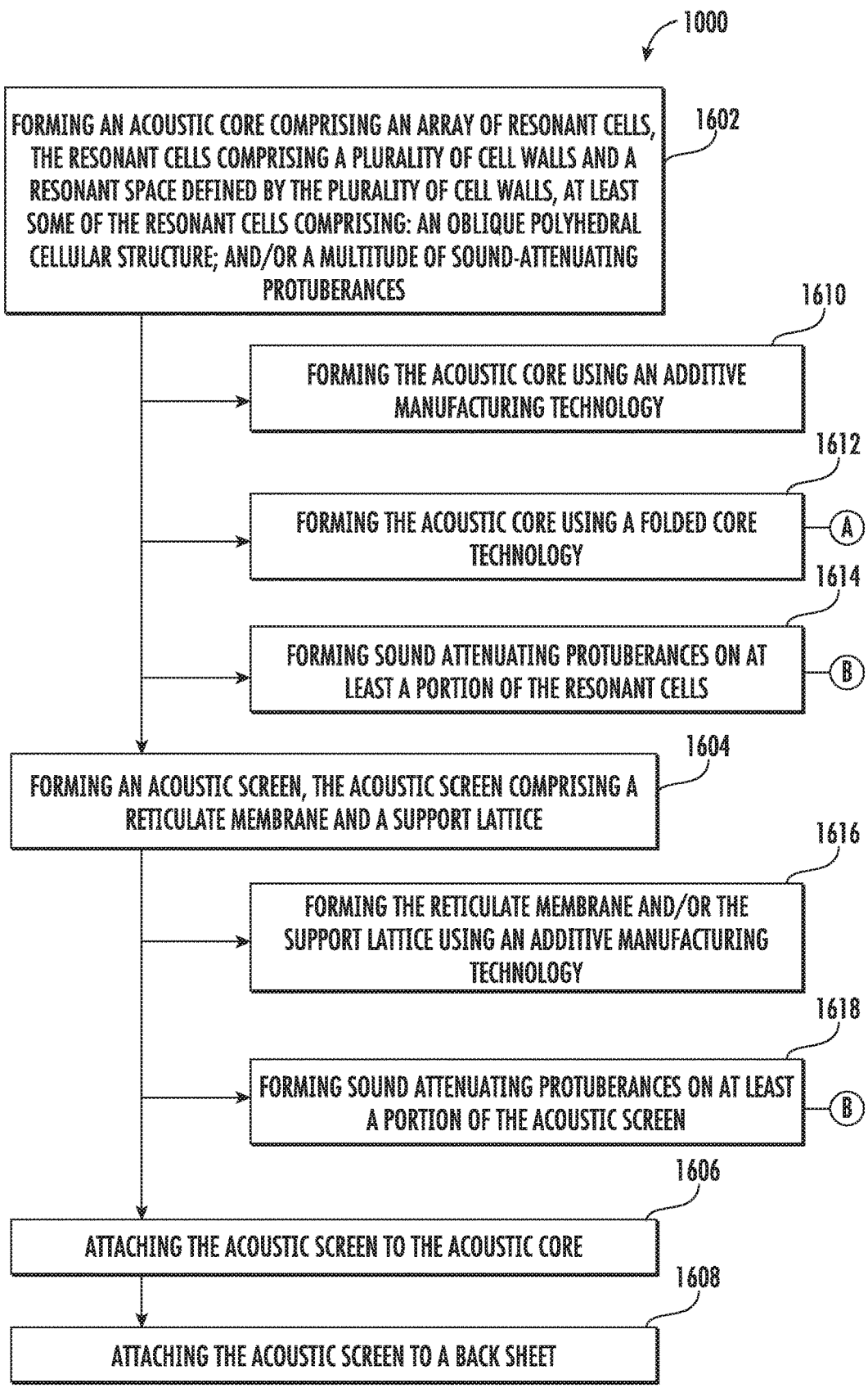
FIGS. 16A-16C show flowchart depicting exemplary methods of forming an acoustic liner.
Figure 16B:
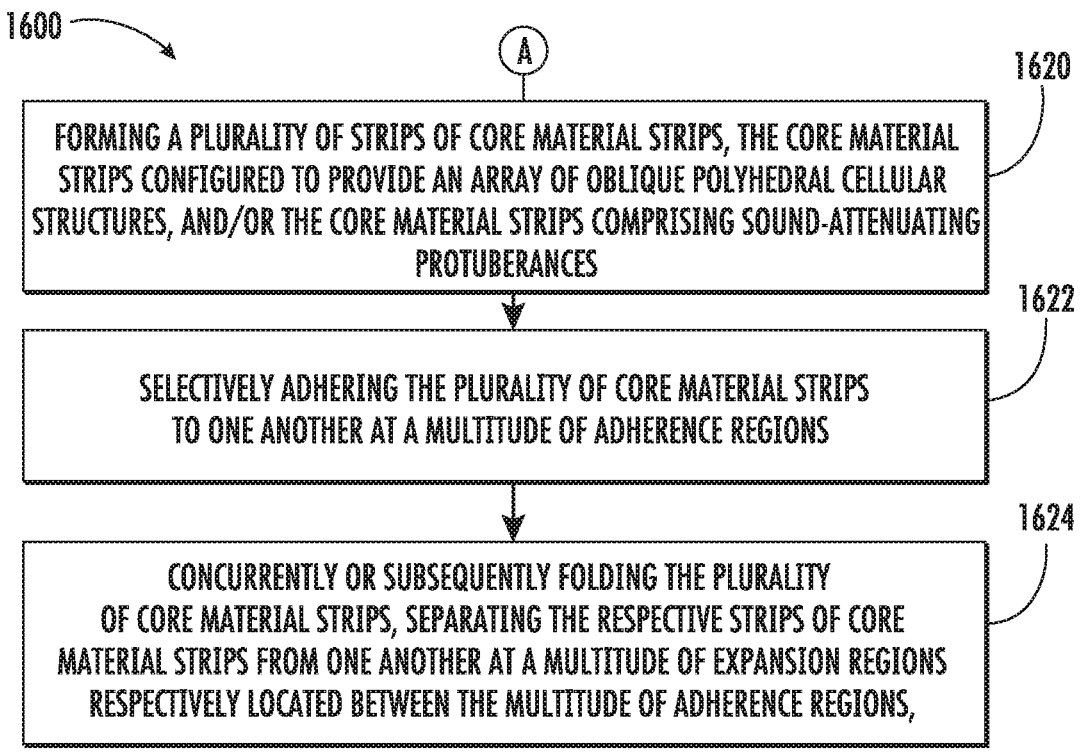
Figure 16C:
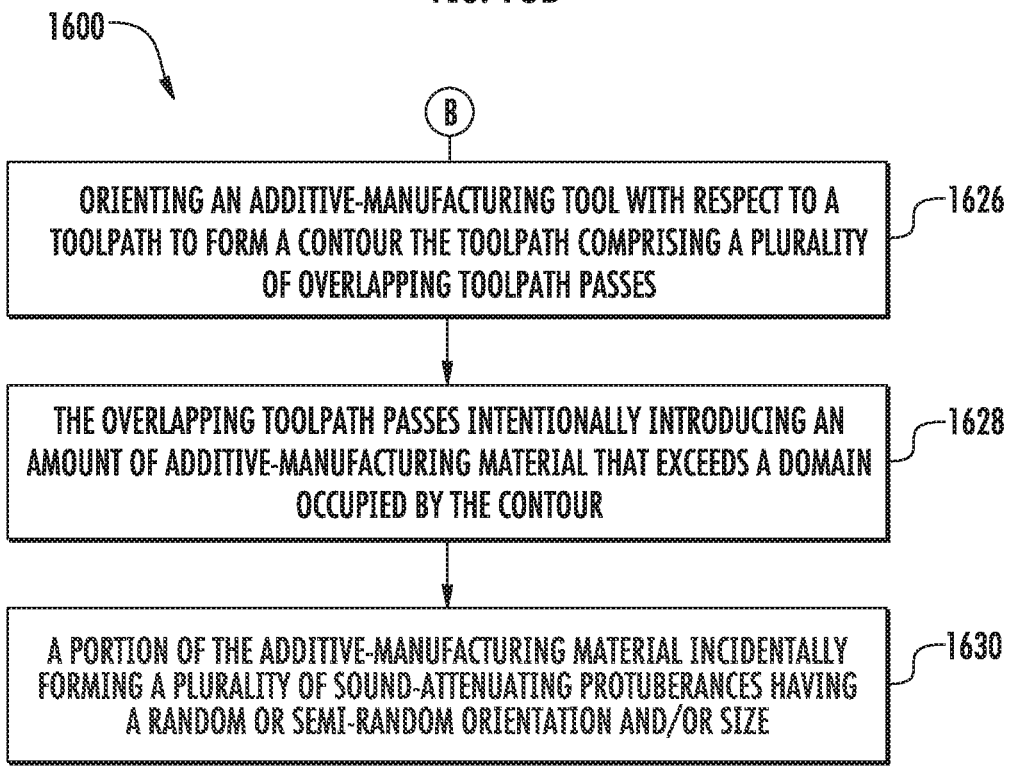

As shown in FIG. 16A, an exemplary method 1600 of forming an acoustic liner 100 may include, at block 1602, forming an acoustic core 200 comprising an array of resonant cells 206. The resonant cells 206 may include a plurality of cell walls and a resonant space 207 defined by the plurality of cell walls. At least some of the resonant cells 206 may include an oblique polyhedral cellular structure 800 and/or a multitude of sound-attenuating protuberances 1200. An exemplary method may additionally include, at block 1604, forming an acoustic screen 202 comprising a reticulate membrane 208 and a support lattice 210, and at block 1606, attaching the acoustic screen 202 to the acoustic core 200. For example, the acoustic screen 202 and the acoustic core 200 may be integrally formed using an additive manufacturing technology. An exemplary method may additionally include, at block 1608, attaching the acoustic core 200 to a back sheet 204.

In exemplary methods 1600, forming an acoustic core, at block 1602, may include, at block 1610, forming the acoustic core 200 at least in part using an additive manufacturing technology. Additionally, or in the alternative, block 1602 may include, at block 1612, forming the acoustic core 200 at least in part using a folded core technology. In some embodiments, block 1602 may include, at block 1614, forming sound-attenuating protuberances 1200 on at least a portion of the resonant cells 206.

Still referring to FIG. 16A, exemplary methods 1600 may additionally or alternatively include, at block 1616, forming the reticulate membrane 208 and/or the support lattice 210 at least in part using an additive manufacturing technology. In some embodiments, exemplary methods 1600 may include, at block 1618, forming sound-attenuating protuberances 1200 on at least a portion of the acoustic screen 202, such as on at least a portion of the reticulate membrane 208 and/or at least a portion of the support lattice 210.

Now turning to FIG. 16B, exemplary methods 1600 that include, at block 1612, forming an acoustic core 200 using a folded core technology will be described. As shown in FIG. 16B, an exemplary method 1600 may include, at block 1620, forming a plurality of core material strips 1000. The core material strips 1000 may be configured to provide an array of oblique polyhedral cellular structures 800. Additionally, or in the alternative, the core material strips 1000 may include sound-attenuating protuberances 1200. Exemplary methods 1600 may additionally include, at block 1622, selectively adhering the plurality of core material strips 1000 to one another, such as at a multitude of adherence regions 1002. The adherence regions 1002 may be located at selected length intervals along respective core material strips 1000.

Exemplary methods may further include, at block 1624, concurrently or subsequently folding the plurality of core material strips 1000. The respective core material strips 1000 may be thereby separated from one another or expanded at a multitude of expansion regions 1004. Such expansion regions 1004 may be respectively located between the multitude of adherence regions 1002. Such folding and/or expanding may provide an array of oblique polyhedral cellular structures 800. For example, the core material strips 1000 may be configured in accordance with the present disclosure to provide an array of resonant cells 206 that includes a plurality of converging polyhedral cells and a plurality of diverging polyhedral cells.

Now turning to FIG. 16C, exemplary methods 1600 that include, block 1614 (forming sound-attenuating protuberances 1200 on at least a portion of the resonant cells 206) and block 1618 (forming sound-attenuating protuberances 1200 on at least a portion of the acoustic screen 202) will be described. As shown in FIG. 16C, an exemplary method 1600 may include, at block 1626, orienting an additive manufacturing tool with respect to a toolpath to form a contour, with the toolpath including a plurality of overlapping toolpath passes 1302, 1304. The contour may correspond to at least a portion of the acoustic core 200 and/or at least a portion of the acoustic screen 202.

The overlapping toolpath passes may be configured such that, at block 1628, the overlapping toolpath passes 1302, 1304 intentionally introduce an amount of additive manufacturing material that exceeds a domain 1201 occupied by the contour. As the amount of additive manufacturing material intentionally introduced exceeds the domain 1201 occupied by the contour, at block 1630, a portion of the additive manufacturing material may incidentally form a plurality of sound-attenuating protuberances 1200 having a random or semi-random orientation and/or size.

Sequential contours of an acoustic core 200 and/or an acoustic screen 202 may be formed by orienting an additive manufacturing tool with respect to sequential toolpaths in which at least a portion of the sequential toolpaths include overlapping toolpath passes. The formation of the sound-attenuating protuberances 1200 may be intentionally incidental to the formation of the acoustic core 200. In some embodiments, the additive manufacturing tool may utilize an additive manufacturing technology that introduces an additive manufacturing material to form the sequential contours of the acoustic core 200 and/or the sequential contours of the acoustic screen 202. The overlapping toolpath passes may cause an excess of additive manufacturing material to be introduced into the respective domains 1201 occupied by the respective contours corresponding to the overlapping toolpath passes 1302, 1304. Adjacent contours may force excess additive manufacturing material outward to incidentally form the plurality of sound-attenuating protuberances 1200. The additive manufacturing technology may include material extrusion, material jetting, binder jetting, and/or directed energy deposition. For example, the additive manufacturing technology may include fused deposition modeling (FDM) or fused filament fabrication (FFF).

In other embodiments, the additive manufacturing tool may utilize an additive manufacturing technology that introduces an additive energy to an amorphous additive manufacturing material. The additive energy may solidify a portion of the amorphous additive manufacturing material to form the sequential contours of the acoustic core 200 and/or the acoustic screen 202. The overlapping toolpath passes 1302, 1304 may cause excess additive energy to be introduced into the respective domains 1201 occupied by the respective contours corresponding to the overlapping toolpath passes 1302, 1304. Excess additive energy may propagate outward from the respective contours to incidentally form the plurality of sound-attenuating protuberances 1200. The additive manufacturing technology may include powder bed fusion or vat photopolymerization. For example, the additive manufacturing technology may include selective laser sintering.

The presently disclosed acoustic liners may be utilized, for example, in a turbomachine, such as a turbofan engine 102. An exemplary turbomachine may include a turbine 106 and a fan rotor 108, and a housing or nacelle 104 surrounding the turbine 106 and/or a fan rotor 108, the housing or nacelle 104 defining a duct wall 114, and one or more acoustic liners 100 disposed annularly along the duct wall 114. At least one of the one or more acoustic liners 100 may include an acoustic core 200 comprising an array of resonant cells 206. At least some of the resonant cells 206 may include an oblique polyhedral cellular structure 800 and/or a multitude of sound-attenuating protuberances 1200. The acoustic liner 100 may further include an acoustic screen 202 disposed across the array of resonant cells 206, and the acoustic screen 202 may include a reticulate membrane 208 and a support lattice 210.

This written description uses exemplary embodiments to describe the presently disclosed subject matter, including the best mode, and also to enable any person skilled in the art to practice such subject matter, including making and using any devices or systems and performing any incorporated methods. The patentable scope of the presently disclosed subject matter is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. An acoustic liner, comprising:
  an acoustic core comprising an array of resonant cells, the array of resonant cells comprising a plurality of cell walls and a resonant space defined by the plurality of cell walls, wherein the acoustic core comprises
  an acoustic screen disposed across the array of resonant cells, the acoustic screen comprising a reticulate membrane and a support lattice;
  wherein the support lattice defines a plurality of apertures, and wherein the reticulate membrane comprises a plurality of portions respectively extending across a corresponding one of the plurality of apertures, and wherein respective ones of the plurality of portions of the reticulate membrane define a curved surface extending across a corresponding one of the plurality of apertures defined by the support lattice, the curved surface comprising at least one of a convex curved surface and a concave curved surface.

2. The acoustic liner of claim 1, comprising:
  at least a portion of the acoustic core and at least a portion of the acoustic screen having been integrally formed using an additive manufacturing technology.

3. The acoustic liner of claim 1, wherein the reticulate membrane comprises:
  a multitude of reticulations passing through a membrane matrix.

4. The acoustic liner of claim 3, wherein the reticulate membrane has a thickness of from 0.1 millimeters to 2.0 millimeters.

5. The acoustic liner of claim 4, wherein the multitude of reticulations have a cross-sectional width of from 1.0 micron to 2.0 millimeters.

6. The acoustic liner of claim 3, wherein the reticulate membrane is rigid or flexible.

7. The acoustic liner of claim 1, wherein the reticulate membrane and/or the support lattice comprises:
  a polymeric material, a metal alloy, and/or a composite materials.

8. The acoustic liner of claim 1, wherein the acoustic core comprises a folded acoustic core, and/or wherein at least some of the resonant cells comprise:
  an oblique polyhedral cellular structure; and/or
  a multitude of sound-attenuating protuberances.

9. The acoustic liner of claim 1, wherein the resonant cells comprise a resonant space, and wherein the plurality of apertures defined by the support lattice provide an open area of from 20% to 100% of the surface area of the resonant space.

10. The acoustic liner of claim 1, wherein the support lattice comprises an aerodynamic profile and/or a Coanda surface.

11. The acoustic liner of claim 1, wherein the reticulate membrane comprises a first reticulate membrane-material and a second reticulate membrane-material, the first reticulate membrane-material differing from the second reticulate membrane-material.

12. The acoustic liner of claim 1, wherein the reticulate membrane comprises intra-membrane resonant cells.

13. The acoustic liner of claim 1, wherein the reticulate membrane comprises intra-membrane curved surfaces.

14. A turbomachine comprising:
  a turbine;
  a fan rotor;
  a housing or nacelle surrounding the turbine and/or the fan rotor, the housing or nacelle defining a duct wall; and
  one or more acoustic liners disposed annularly along the duct wall, at least one of the one or more acoustic liners comprising:
  an acoustic core comprising an array of resonant cells, wherein the acoustic core comprises
  an acoustic screen disposed across the array of resonant cells, the acoustic screen comprising a reticulate membrane and a support lattice;
  wherein the support lattice defines a plurality of apertures, and wherein the reticulate membrane comprises a plurality of portions respectively extending across a corresponding one of the plurality of apertures, and wherein respective ones of the plurality of portions of the reticulate membrane define a curved surface extending across a corresponding one of the plurality of apertures defined by the support lattice, the curved surface comprising at least one of a convex curved surface and a concave curved surface.

15. A method of forming an acoustic liner, the method comprising:
attaching an acoustic screen to an acoustic core, the acoustic screen comprising a reticulate membrane and a support lattice, and the acoustic core comprising an array of resonant cells comprising a plurality of cell walls and a resonant space defined by the plurality of cell walls;
wherein the support lattice defines a plurality of apertures, and wherein the reticulate membrane comprises a plurality of portions respectively extending across a corresponding one of the plurality of apertures, and wherein respective ones of the plurality of portions of the reticulate membrane define a curved surface extending across a corresponding one of the plurality of apertures defined by the support lattice, the curved surface comprising at least one of a convex curved surface and a concave curved surface; and
wherein the acoustic core comprises a folded acoustic core and/or at least some of the resonant cells comprise:
an oblique polyhedral cellular structure; and/or
a multitude of sound-attenuating protuberances.

16. The method of claim 15, comprising:
forming the reticulate membrane and/or the support lattice at least in part using an additive manufacturing technology.

17. The method of claim 16, comprising:
forming sound-attenuating protuberances on at least a portion of the acoustic screen.

18. The method of claim 15, comprising:
forming the acoustic core at least in part using an additive manufacturing technology.

19. The method of claim 18, comprising:
forming sound-attenuating protuberances on at least a portion of the resonant cells.

20. The method of claim 15, comprising:
forming the acoustic core at least in part using a folded core technology.

* * * * *